(12) United States Patent
Takahashi

(10) Patent No.: US 9,190,048 B2
(45) Date of Patent: Nov. 17, 2015

(54) SPEECH DIALOGUE SYSTEM, TERMINAL APPARATUS, AND DATA CENTER APPARATUS

(71) Applicant: FUJITSU LIMITED, Kawasaki-shi, Kanagawa (JP)

(72) Inventor: Jun Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 309 days.

(21) Appl. No.: 13/780,620

(22) Filed: Feb. 28, 2013

(65) Prior Publication Data

US 2013/0253926 A1    Sep. 26, 2013

(30) Foreign Application Priority Data

Mar. 26, 2012  (JP) .................. 2012-069511

(51) Int. Cl.

| | |
|---|---|
| *G10L 15/26* | (2006.01) |
| *G10L 13/00* | (2006.01) |
| *G10L 13/04* | (2013.01) |
| *G10L 15/30* | (2013.01) |
| *G10L 25/78* | (2013.01) |
| *G10L 15/16* | (2006.01) |
| *G10L 15/22* | (2006.01) |

(52) U.S. Cl.
CPC ................ *G10L 13/00* (2013.01); *G10L 13/04* (2013.01); *G10L 15/16* (2013.01); *G10L 15/22* (2013.01); *G10L 15/265* (2013.01); *G10L 15/30* (2013.01); *G10L 25/78* (2013.01)

(58) Field of Classification Search
USPC .......... 704/9, 231, 235, 257, 260, 270, 270.1, 704/201, 202, 211, 232, 233, 234, 256
See application file for complete search history.

(56) References Cited

U.S. PATENT DOCUMENTS

| | | |
|---|---|---|
| 2004/0122673 A1 | 6/2004 | Park et al. |
| 2007/0143113 A1 | 6/2007 | Nanavati et al. |

FOREIGN PATENT DOCUMENTS

| | | |
|---|---|---|
| CN | 101341532 | 1/2009 |
| JP | 2002-366175 | 12/2002 |
| JP | 2004-206704 | 7/2004 |
| JP | 2004-282392 | 10/2004 |
| JP | 2008-26621 | 2/2008 |
| JP | 2011-75870 | 4/2011 |

*Primary Examiner* — Vu B Hang
(74) *Attorney, Agent, or Firm* — Staas & Halsey LLP

(57) ABSTRACT

A speech dialog system includes a data center apparatus and a terminal apparatus. The data center apparatus acquires answer information for request information obtained in a speech recognition process for speech data from a terminal apparatus, creates a scenario including the answer information, creates first synthesized speech data concerning the answer information, transmits the first synthesized speech data to the terminal apparatus, and transmits the scenario to the terminal apparatus while the first synthesized speech data is being created in the creating the first synthesized speech data. The terminal apparatus creates second synthesized speech data concerning the answer information in the received scenario, receives the first synthesized speech data, selects one of the first synthesized speech data and the second synthesized speech data based on a determination result regarding whether the reception of the first synthesized speech data is completed, and reproduces speech.

18 Claims, 15 Drawing Sheets

| Speech sound data | Request information | Answer information |
|---|---|---|
| Tell me news | Latest news | Here is today's news. ⋯ |
| Today's weather? | Today's weather | Today will be sunny. |
| Nearby restaurants | Neighboring restaurants | Restaurants popular by word of mouth will be introduced. ⋯ |
| Information of Fujitsu | Information of "Fujitsu" | "Fujitsu" is a company of ⋯ |

FIG. 3

```
10: <state id="START">
11:   <my:download file="weather_0.wav">
12:   <my:download file="weather_1.wav">
13:   <transition event="download.done" target="PLAY0" />
14: </state>

20: <state id="PLAY0">
21:   <my:output sound="weather_0.wav" display="Weather forecast for today" />
22:   <transition event="play.done" target="PLAY1" />
23: </state>

30: <state id="PLAY1">
31:   <my:output sound="weather_1.wav" display="Today will be sunny" />
32:   <transition event="play.done" target="END" />
33: </state>

40: <state id="END">
41: </state>
```

FIG. 4

SPEECH DIALOGUE SYSTEM, TERMINAL APPARATUS, AND DATA CENTER APPARATUS

CROSS-REFERENCE TO RELATED APPLICATION

This application is based upon and claims the benefit of priority of the prior Japanese Patent Application No. 2012-069511, filed on Mar. 26, 2012, the entire contents of which are incorporated herein by reference.

FIELD

The embodiments discussed here relate to a technique of speech synthesis for converting text to speech.

BACKGROUND

The development of computer processing techniques allows realizing a speech dialogue system, in which a speech synthesis technique for converting input text to read-out speech and a speech recognition technique for recognizing pronunciation of a person are used to repeat dialogue by speech between a user and a response system to thereby solve a problem. Due to the development of communication networks, such a speech dialogue system can be used through a communication network.

FIG. 1 illustrates a configuration of an example of such a speech dialogue system. The speech dialogue system is a center-type speech dialogue system including the response system arranged on a data center 2 (hereinafter, called "center 2") on a communication network 1.

When a user 4 speaks to an input apparatus, such as a microphone, included in a terminal 3, the terminal 3 converts the speech to speech data and transmits the speech data to the center 2 through the communication network 1. The center 2 uses the speech recognition technique to recognize the content of the speech from the received speech data and performs dialogue control to create an answer according to the content of the speech. The center 2 uses the speech synthesis technique to convert the answer to the speech data. Subsequently, the terminal 3 downloads speech data and display data from the center 2 through the communication network 1 to sequentially reproduce the speech data and the display data. In this way, the user 4 can use the speech dialogue system as if the user 4 is talking with another person. A speech control menu 6 for displaying the answer, inputting speech, rewinding the speech, terminating the speech, or fast-forwarding the speech as illustrated in a screen display 5 can be displayed on the terminal 3 to provide a function of a Web browser or the like based on speech.

The center-type speech dialogue system can be used from portable terminals, such as smartphones, used by many people, and the center-type speech dialogue system has an advantage that highly accurate speech recognition and high-quality speech synthesis using a large number of hardware resources of the center 2 are possible. The center-type speech dialogue system also has an advantage that information on the communication network, such as an external service and Web information, can be used to utilize real-time information for creating an answer in the center 2.

If the center 2 creates an answer in a format of a so-called scenario describing a procedure of screen display and speech reproduction, the terminal 3 can not only reproduce the speech data, but can also display text and images.

The speech dialogue system can be used to provide various services, such as information of nearby restaurants and tourist information, as well as for listening to latest news or weather forecast.

In relation to the speech synthesis technique, there is a known technique in which synthesized speech can be output without a pause in the speech before the end of a speech synthesis process of an entire sentence, even in the middle of the reproduction of the synthesized speech. In the technique, the output of the synthesized speech is scheduled based on responsiveness of a generation process of sound waveform data of each divided sentence obtained by dividing an input sentence by one or a plurality of synthesis units and based on responsiveness of a formation process of synthesized speech for combining the sound waveform data.

There is also a known technique in which prepared redundant word speech data is output when speech synthesis data generated by input of a conversational sentence is not input for a certain time, and a silent state of conversation is apparently shortened to reduce the stress of the other party of the conversation.

In a speech dialogue process, there is a known technique of preventing conflict between a plurality of speech input and output processes. In the technique, if an estimated time required for a second speech process including speech output executed according to a low-priority service scenario is shorter than an estimated free time until timing of a first speech process executed according to a high-priority service scenario, the second speech process is executed.

In the speech dialogue system, there is a known technique of quickly and accurately managing order of dialogue between a user and an agent. In the technique, dialogue information analyzed from speech generated by the user is used to generate first dialogue order information, and expression information analyzed from face images of the user is used to generate second dialogue order information. The order information, state information of the system, presence/absence of speech input by the user, and no-response time of the user are used to determine ultimate order of dialogue.

In a speech content distribution system for distributing content for outputting speech to a terminal apparatus, there is a known technique of reducing the time before the output of the speech by the terminal that has received the content. In the technique, a content distribution apparatus replaces a readout character string, which is in content data describing the readout character string that is a character string to be read out as speech, by a phonetic symbol string that is data for identifying output speech. The terminal apparatus outputs the speech based on the phonetic symbol string extracted from the content data that is received from the content distribution apparatus and that describes the phonetic symbol string.

SUMMARY

According to an aspect of the embodiment, a speech dialogue system includes a data center apparatus that receives speech data of speech sound transmitted from a terminal apparatus, applies a speech recognition process to the speech data to acquire request information expressed by the speech data, acquires answer information for the request information from an information source, creates a scenario including the answer information, creates first synthesized speech data expressing synthesized speech that generates sound of the answer information, transmits the first synthesized speech data created in the creating the first synthesized speech data to the terminal apparatus, and transmits the scenario to the terminal apparatus while the first synthesized speech data is being created in the creating the first synthesized speech data, and the terminal apparatus that acquires input of the speech sound to convert the speech sound to speech data expressing the speech sound, transmits the speech data of the speech sound to the data center apparatus, receives the scenario transmitted from the data center apparatus, creates second synthesized speech data expressing the synthesized speech that generates sound of the answer information included in the received scenario, receives the first synthesized speech data transmitted from the data center apparatus, determines whether the reception of the first synthesized speech data is completed to select one of the first synthesized speech data and the second synthesized speech data based on the determination result, and outputs the synthesized speech expressed by the synthesized speech data selected in the determining, wherein the data center apparatus and the terminal apparatus being connected through a communication network.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a table illustrating an example of answer information acquired according to request information.

FIG. 4 is a description example of a scenario.

DESCRIPTION OF EMBODIMENTS

Figure 1:
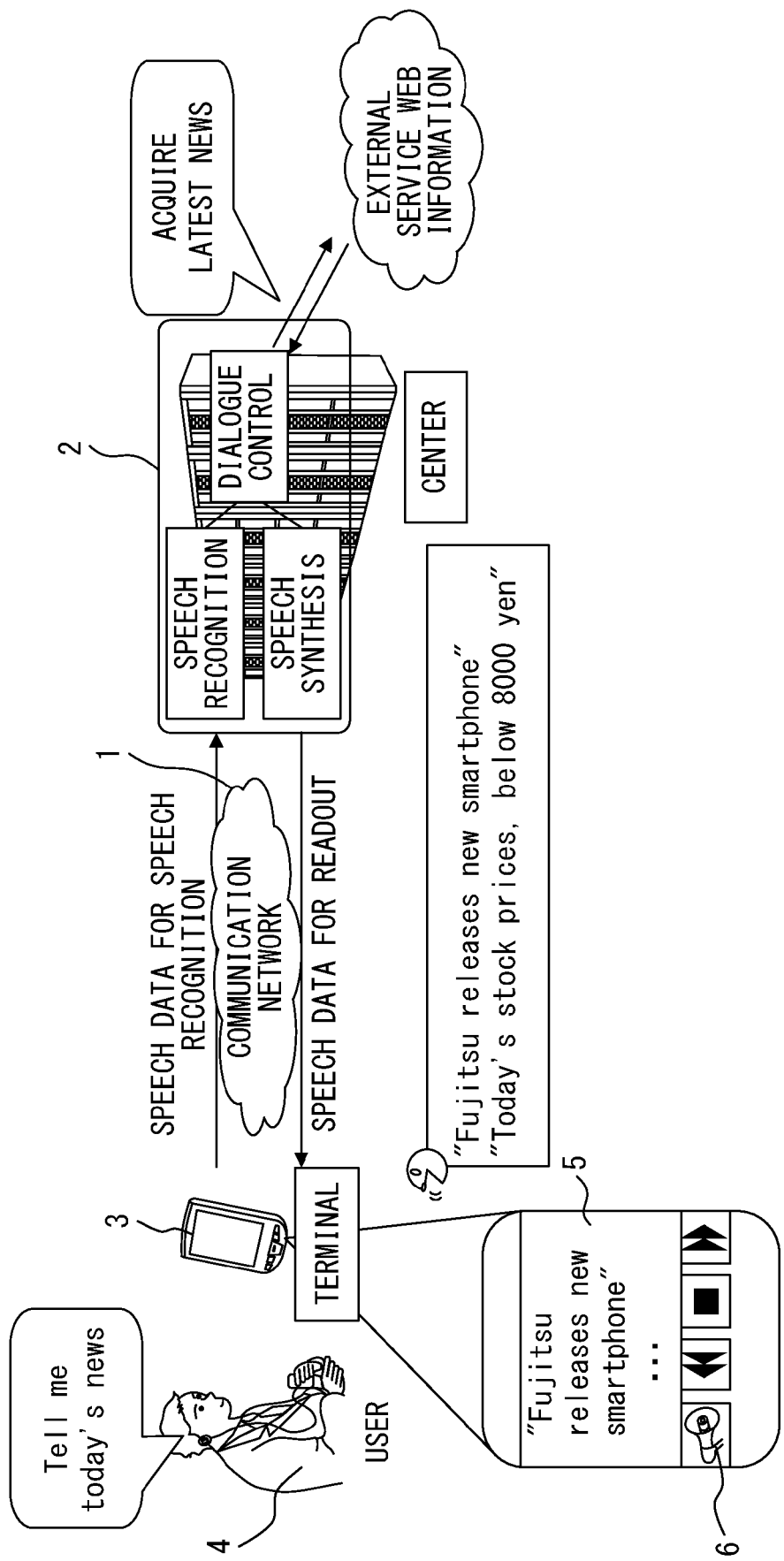
FIG. 1 is a diagram illustrating a configuration of an example of a speech dialogue system.

To improve the response felt by the user 4 in the speech dialogue system as illustrated in FIG. 1, processes of speech recognition, dialogue control, and speech synthesis in the center 2 need to be executed fast. In addition, a state of no-response needs to be as small as possible in the dialogue between the user 4 and the terminal 3.

The speed-up of the processes can be solved by reinforcement of the system in the center 2. However, the occurrence of the no-response state in the dialogue largely depends on the situation of the communication network 1 that is outside of the management of the installer of the speech dialogue system. Therefore, it is not easy to prevent the occurrence of the no-response state.

Figure 2:
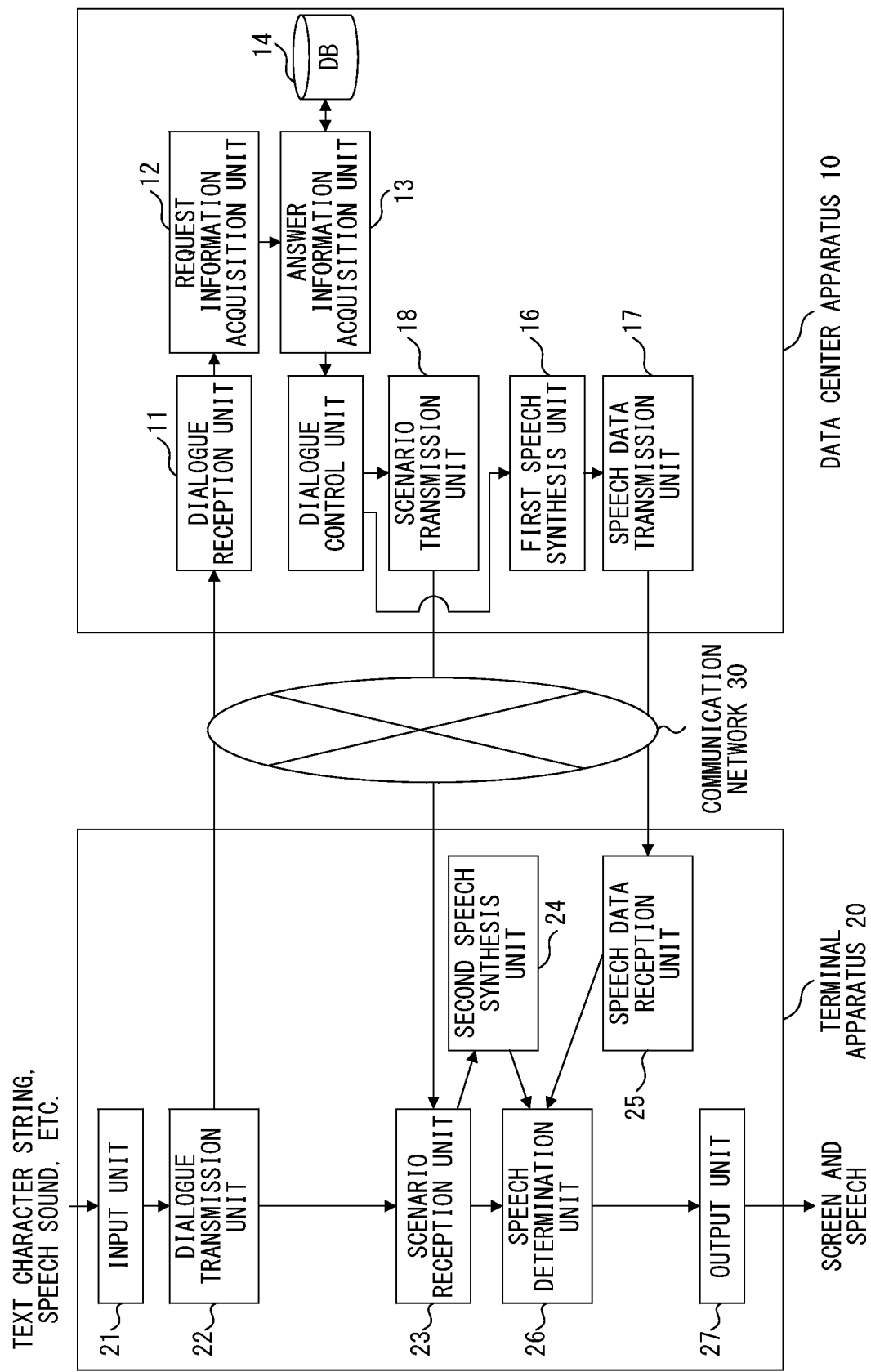
FIG. 2 is a functional configuration diagram of an embodiment of a speech dialogue system.

FIG. 2 will be described. FIG. 2 is a functional configuration diagram of an embodiment of a speech dialogue system.

The speech dialogue system of FIG. 2 includes a data center apparatus 10 and a terminal apparatus 20. The data center apparatus 10 and the terminal apparatus 20 are connected through a communication network 30 and are capable of transferring various data through the communication network 30. The communication network 30 can be either a radio link or a wired link, or the radio link and the wired link may be combined.

The data center apparatus 10 includes a dialogue reception unit 11, a request information acquisition unit 12, an answer information acquisition unit 13, a database 14, a dialogue control unit 15, a first speech synthesis unit 16, a speech data transmission unit 17, and a scenario transmission unit 18.

The dialogue reception unit 11 receives speech data of speech sound transmitted from the terminal apparatus 20.

The request information acquisition unit 12 applies a speech recognition process to the speech data received by the dialogue reception unit 11 and acquires request information expressed by the speech data.

The answer information acquisition unit 13 acquires, from the database 14, answer information for the request information acquired by the request information acquisition unit 12.

The database (DB) 14 is an information source storing various pieces of information. The database 14 may be installed outside of the data center apparatus 10. The database 14 may be installed at a remote location of the installation location of the data center apparatus 10, and the data center apparatus 10 may access the database 14 through a communication line.

The dialogue control unit 15 creates a data file of a scenario including the answer information acquired by the answer information acquisition unit 13. The data file of the scenario will be simply called a "scenario". Details of the creation of the scenario will be described later.

The first speech synthesis unit 16 creates first synthesized speech data expressing synthesized speech that generates the sound of the answer information acquired by the answer information acquisition unit 13.

The speech data transmission unit 17 is a speech data transmission unit that transmits the first synthesized speech data created by the first speech synthesis unit to the terminal apparatus.

While the first speech synthesis unit 16 is creating the first synthesized speech data, the scenario transmission unit 18 transmits the scenario created by the dialogue control unit 15 to the terminal apparatus 20.

Meanwhile, the terminal apparatus 20 includes an input unit 21, a dialogue transmission unit 22, a scenario reception unit 23, a second speech synthesis unit 24, a speech data reception unit 25, a speech determination unit 26, and an output unit 27.

The input unit 21 acquires input of speech sound and converts the speech sound to speech data expressing the acquired speech sound.

The dialogue transmission unit 22 transmits the speech data of the speech sound obtained by the input unit 21 to the data center apparatus 10.

The scenario reception unit 23 receives the scenario transmitted from the data center apparatus 10.

The second speech synthesis unit 24 creates second synthesized speech data expressing synthesized speech that generates the sound of the answer information included in the scenario received by the scenario reception unit 23.

The speech data reception unit 25 receives the first synthesized speech data transmitted from the data center apparatus 10.

The speech determination unit 26 determines whether the reception of the first synthesized speech data by the speech data reception unit 25 is completed and selects one of the first synthesized speech data and the second synthesized speech data based on the determination result.

The output unit 27 outputs the synthesized speech expressed by the synthesized speech data selected by the speech determination unit 26.

The speech dialogue system of FIG. 2 has the foregoing configuration.

The scenario created by the dialogue control unit 15 of the data center apparatus 10 in the speech dialogue system of FIG. 2 will be described. The scenario is data indicating procedures of output by the terminal apparatus 20, such as a procedure of screen display in the terminal apparatus 20, order of download of the speech data from the data center apparatus 10, and order of reproduction of the downloaded speech data.

For example, it is assumed that answer information as illustrated in a table of FIG. 3 is obtained for the request information acquired by the answer information acquisition unit 13.

In the table of FIG. 3, "Speech sound data", "Request information", and "Answer information" are associated in each line. The "Speech sound data" denotes content of speech data received by the dialogue reception unit 11. The "Request information" denotes information that is acquired as a result of application of a speech recognition process to the "Speech sound data" by the request information acquisition unit 12 and that is for identifying the target of information search for the database 14. The "Answer information" denotes information obtained from the database 14 as a result of the search of the "Request information" by the answer information acquisition unit 13.

An example of a method of selecting the database 14 as a target of the information search includes a method of using the database 14 included in the data center apparatus 10 in normal cases and using the database 14 outside of the data center apparatus 10 if a specific keyword is included. For example, if the request information includes a specific keyword, such as "news" and "weather forecast", the answer information acquisition unit 13 may obtain the answer information from a news site, a weather forecast site, or the like outside of the data center apparatus 10.

When the answer information acquisition unit 13 acquires the answer information, the dialogue control unit 15 creates a scenario including the acquired answer information. For example, a markup language for describing handling of speech data, such as VoiceXML and SCXML proposed as formats of XML (Extensible Markup Language), can be used to describe the scenario.

FIG. 4 illustrates a description example of the scenario in the text file, and tags are used to describe a reproduction method of text information and speech data. As illustrated in the table of FIG. 3, the dialogue control unit 15 creates the description example when text data "Today will be sunny." is obtained as the "answer information".

In the description example of FIG. 4, the number at the top of each line is a line number provided for the convenience of the description.

In the description example of FIG. 4, <state> tags, <my:download> tags, <my:output> tags, and <transition> tags are used. The tags have the following meanings.

The <state> tag identifies a state.

The <my:download> tag identifies speech data to be downloaded.

The <my:output> tag identifies speech data to be reproduced and text to be displayed.

The <transition> tag identifies an event of an occurrence condition of state transition and a destination.

Figure 5:
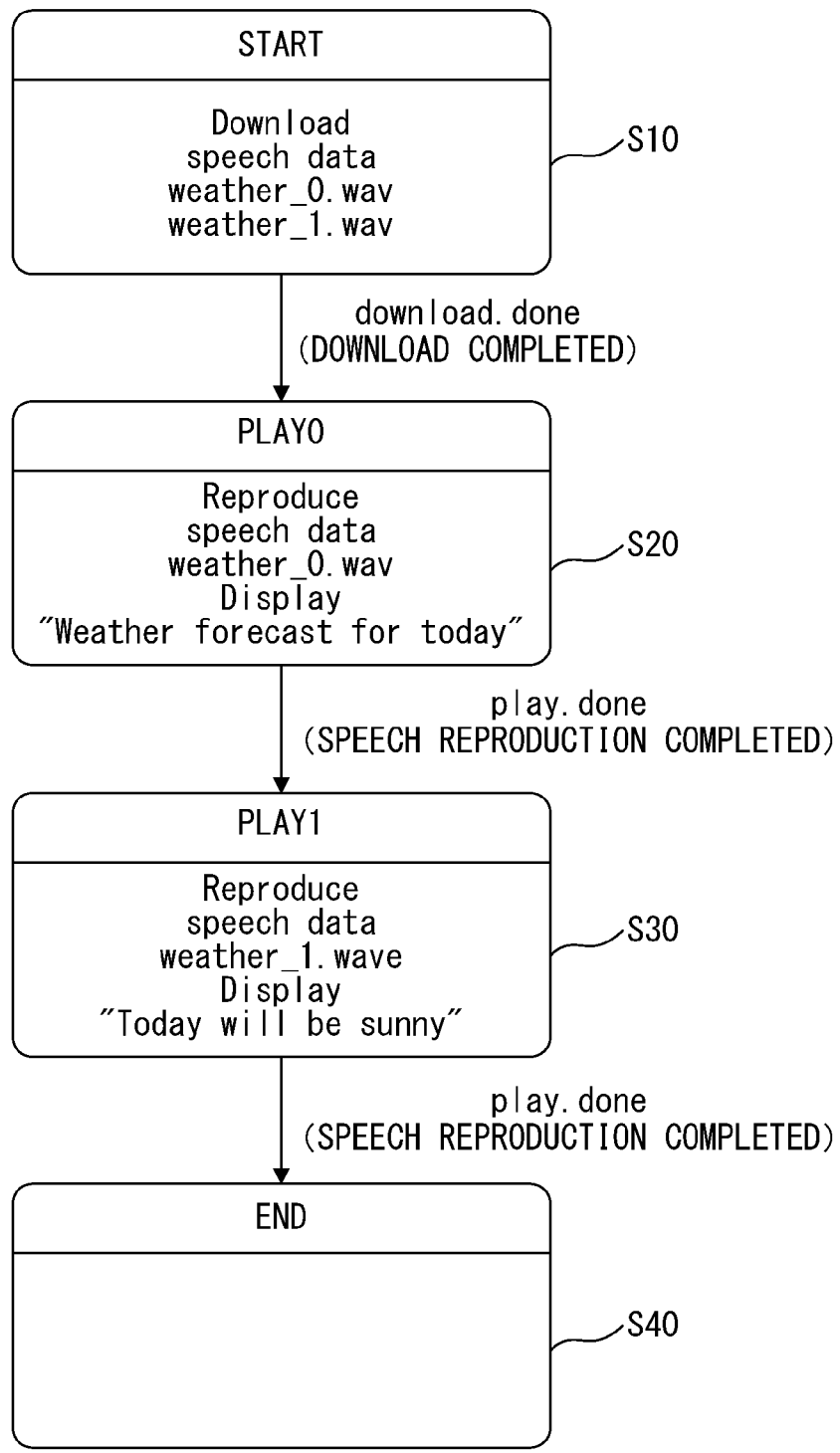
FIG. 5 is an explanatory view of state transition expressed by the scenario of FIG. 4.

FIG. 5 will be described. FIG. 5 depicts state transition expressed by the scenario illustrated in FIG. 4.

In FIG. 5, S10 denotes a "START" state indicating the state of the scenario. S10 corresponds to lines 10 to 14 of FIG. 4. In this state, the terminal apparatus 20 first downloads speech data "weather_0.wav" (line 11) and then downloads speech data "weather_1. wav" (line 12). When the download is completed, the terminal apparatus 20 shifts the state to a "PLAY0" state (line 13).

The speech data "weather_0.wav" is first synthesized speech data that is created by the first speech synthesis unit 16 of the data center apparatus 10 and that generates sound of text "Weather forecast for today" used when the answer information is related to weather forecast. The speech data "weather_1.wav" is first synthesized speech data that is created by the first speech synthesis unit 16 of the data center apparatus 10 and that generates sound of text "Today will be sunny" as the answer information.

S20 indicates the "PLAY0" state and corresponds to lines 20 to 23 of FIG. 4. In this state, the terminal apparatus 20 reproduces the speech data "weather_0.wav" and displays the text "Weather forecast for today" (line 21). When the reproduction of the speech data "weather_0.wav" is completed, the terminal apparatus 20 shifts the state to a "PLAY1" state (line 22).

S30 indicates the "PLAY1" state and corresponds to lines 30 to 33 of FIG. 4. In this state, the terminal apparatus 20 reproduces the speech data "weather_1.wav" and displays the text "Today will be sunny" (line 31). When the reproduction of the speech data "weather_1.wav" is completed, the terminal apparatus 20 shifts the state to an "END" state (line 32).

S40 illustrates the "END" state indicating the end of the scenario. S40 corresponds to lines 40 and 41 of FIG. 4.

In this way, the scenario defines the state transition of the terminal apparatus 20 that has received the scenario. When the event occurs, the state of the terminal apparatus 20 can be switched to the described state to change the speech data to be reproduced or the text information to be displayed.

In the present embodiment, the dialogue control unit 15 uses a scenario template to create the scenario. The scenario template is a data file already describing the data in the scenario, except the answer information and the data file name of the synthesized speech that generates the sound of the answer information. The dialogue control unit 15 adds the answer information and the data file name of the synthesized speech that generates the sound of the answer information to the scenario template to create the scenario.

For example, in the description example of the scenario of FIG. 4, the scenario template includes the description except the speech data file name "weather_1.wav" and the text "Today will be sunny" described in line 31. The dialogue control unit 15 adds the description of the speech data file name "weather_1.wav" and the text "Today will be sunny" to the scenario template to create the scenario of FIG. 4.

The scenario template is prepared for each presumable type of answer information, such as "news" and "weather forecast". The dialogue control unit 15 selects the scenario template according to the type of the answer information acquired by the answer information acquisition unit 13 and uses the selected scenario template to create the scenario for the answer information.

The state transition expressed by FIGS. 4 and 5 indicates transition only in a certain direction. However, transition in both directions and state transition in another direction are also possible. The number of scenarios generated by the dialogue control unit 15 is not limited to one. For example, if there is a large amount of content in the scenario, the scenario may be divided and created according to the situation, and the scenario transmission unit 18 may transmit the divided scenarios one by one.

In the speech dialogue system of FIG. 2, the first speech synthesis unit 16 of the data center apparatus 10 utilizes abundant hardware resources to create the first synthesized speech data in which the quality of the synthesized speech is high. Meanwhile, the scenario transmission unit 18 transmits the scenario created by the dialogue control unit 15 to the terminal apparatus 20 in advance, while the first speech synthesis unit 16 is creating the first synthesized speech data before the transmission of the first synthesized speech data by the speech data transmission unit 17. Since the scenario includes the answer information acquired by the answer information acquisition unit 13 from the database 14, the second speech synthesis unit 24 of the terminal apparatus 20 can create the second synthesized speech data expressing the synthesized speech that generates the sound of the answer information. Therefore, even if the arrival of the first synthesized speech data is delayed due to the situation of the communication network 30, the terminal apparatus 20 tentatively reproduces the second synthesized speech data to provide latest answer information thereby suppress the occurrence of the no-response state in the dialogue.

A hardware configuration of the speech dialogue system of FIG. 2 will be described.

Figure 6:
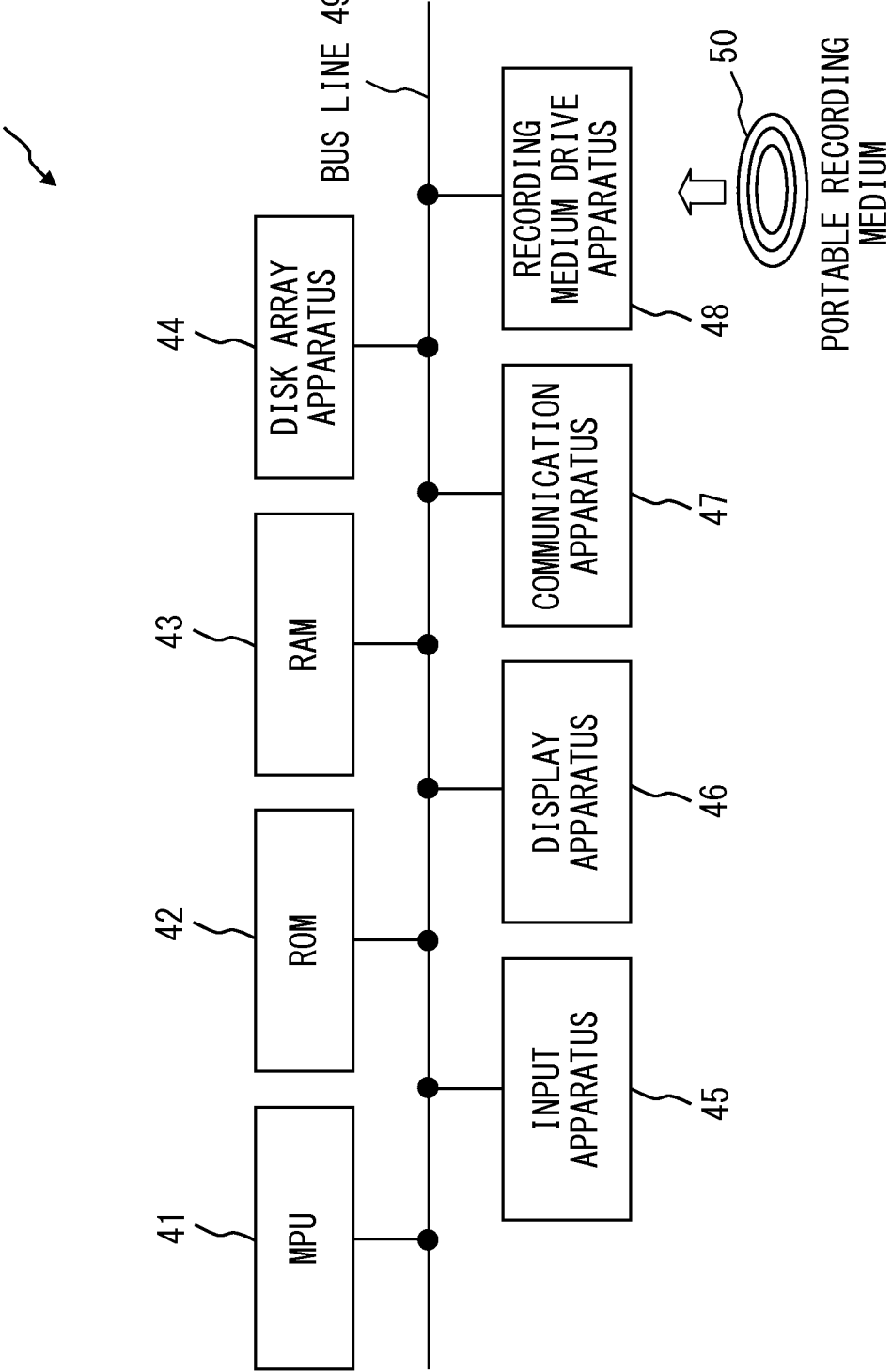
FIG. 6 is a diagram depicting a hardware configuration example of a data center apparatus.

First, FIG. 6 will be described. FIG. 6 is a diagram depicting a hardware configuration example of the data center apparatus 10.

The configuration of the data center apparatus 10 of FIG. 6 is similar to the configuration of a standard computer system. More specifically, the data center apparatus 10 includes an MPU 41, a ROM 42, a RAM 43, a disk array apparatus 44, an input apparatus 45, a display apparatus 46, a communication apparatus 47, and a recording medium drive apparatus 48. These constituent elements are connected through a bus line 49, and various data can be mutually transferred under the management of the MPU 41.

The MPU (Micro Processing Unit) 41 is an arithmetic processing apparatus (processor) that controls the entire operation of the data center apparatus 10.

The ROM (Read Only Memory) 42 is a read-only semiconductor memory storing a predetermined basic control program recorded in advance. The MPU 41 can control the operation of the constituent elements of the data center apparatus 10 by reading and executing the basic control program at the activation of the data center apparatus 10. A memory with non-volatile storage data, such as a flash memory, may be used as the ROM 42.

The RAM (Random Access Memory) 43 is a readable/writable semiconductor memory used as a working storage area as necessary when the MPU 41 executes various control programs.

The disk array apparatus 44 includes a plurality of logically bundled hard disk drives and is a storage apparatus that stores various control programs executed by the MPU 41 and various data. The MPU 41 can execute various control processes by reading and executing predetermined control programs stored in the disk array apparatus 44. The disk array apparatus 44 can also be used as, for example, a storage apparatus that stores the database 14 in advance when the database 14 is included in the data center apparatus 10.

The input apparatus 45 is, for example, a keyboard apparatus or a mouse apparatus. When, for example, the manager of the data center apparatus 10 operates the input apparatus 45, the input apparatus 45 acquires input of various pieces of information from the manager associated with the operation and transmits the acquired input information to the MPU 41.

The display apparatus 46 is, for example, a liquid crystal display. The display apparatus 46 displays various text and images according to output data transmitted from the MPU 41.

The communication apparatus 47 connects the data center apparatus 10 to the communication network 30 and manages transfer of various data to and from the terminal apparatus 20.

The recording medium drive apparatus 48 is an apparatus that reads various control programs and data recorded in the portable recording medium 50. The MPU 41 can read, through the recording medium drive apparatus 48, predetermined control programs recorded in the portable recording medium 50 and execute the programs to execute various control processes. Examples of the portable recording medium 50 include a CD-ROM (Compact Disc Read Only Memory), a DVD-ROM (Digital Versatile Disc Read Only Memory), and a flash memory with a connector of USB (Universal Serial Bus) standard.

To use the constituent elements to realize the data center apparatus 10, for example, a control program for causing the MPU 41 to execute a control process executed in the data center apparatus 10 is created, which will be described later. The created control program is stored in advance in the disk array apparatus 44 or the portable recording medium 50. A predetermined instruction is provided to the MPU 41 to cause the MPU 41 to read and execute the control program. In this way, the constituent elements of FIG. 6 can be operated as the dialogue reception unit 11, the request information acquisition unit 12, the answer information acquisition unit 13, the database 14, the dialogue control unit 15, the first speech synthesis unit 16, the speech data transmission unit 17, and the scenario transmission unit 18.

Figure 7:
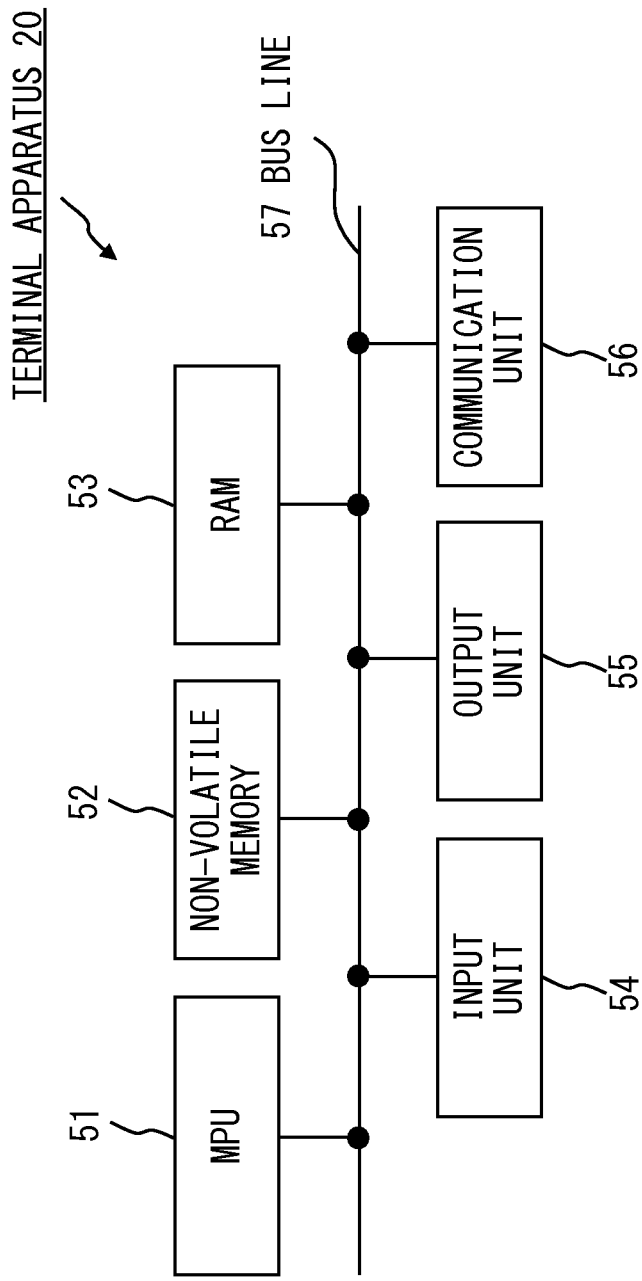
FIG. 7 is a diagram depicting a hardware configuration example of a terminal apparatus.

FIG. 7 will be described. FIG. 7 is a diagram depicting a hardware configuration example of the terminal apparatus 20.

The terminal apparatus 20 of FIG. 7 includes an MPU 51, a non-volatile memory 52, a RAM 53, an input unit 54, an output unit 55, and a communication unit 56. These constituent elements are connected through a bus line 57, and various data can be mutually transferred under the management of the MPU 51.

The MPU 51 is an arithmetic processing apparatus (processor) that controls the entire operation of the terminal apparatus 20.

The non-volatile memory 52 is, for example, a flash memory, and a predetermined basic control program is recorded in advance. The MPU 51 can control the operation of the constituent elements of the terminal apparatus 20 by reading and executing the basic control program at the activation of the terminal apparatus 20. The non-volatile memory 52 also has a function of a storage apparatus that stores various control programs executed by the MPU 41 and various data. The MPU 51 can read and execute predetermined control programs stored in the non-volatile memory 52 to execute various control processes.

The RAM (Random Access Memory) 53 is a readable/writable semiconductor memory used as a working storage area as necessary when the MPU 51 executes various control programs.

The input unit 54 includes a microphone apparatus, a keyboard apparatus, etc. When the user of the terminal apparatus 20 speaks, the microphone apparatus collects the speech sound. A converter not illustrated converts the speech sound to speech data expressing the speech sound, and the speech data is transmitted to the MPU 51. When the user of the terminal apparatus 20 operates the keyboard apparatus, input of various pieces of information from the user associated with the operation is acquired, and the acquired information is transmitted to the MPU 51.

The output unit 55 includes a speaker, a liquid crystal display, etc. When speech data is transmitted from the MPU 51 to the output unit 55, a converter not illustrated converts the speech data to an analog speech signal, and the output unit 55 drives the speaker to release the speech expressed by the speech data. When text data or image data is transmitted from the MPU 51 to the output unit 55, the output unit 55 displays text or an image indicated by the data on the liquid crystal display.

The communication unit 56 connects the terminal apparatus 20 to the communication network 30 to manage transfer of various data to and from the data center apparatus 10.

To use these constituent elements to realize the terminal apparatus 20, for example, a control program for causing the MPU 51 to execute a control process executed in the terminal apparatus 20 is created, which will be described later. The created control program is stored in advance in the non-volatile memory 52. A predetermined instruction is provided to the MPU 51 to cause the MPU 51 to read and execute the control program. In this way, the constituent elements of FIG. 7 can be operated as the input unit 21, the dialogue transmission unit 22, the scenario reception unit 23, the second speech synthesis unit 24, the speech data reception unit 25, the speech determination unit 26, and the output unit 27.

Figure 8:
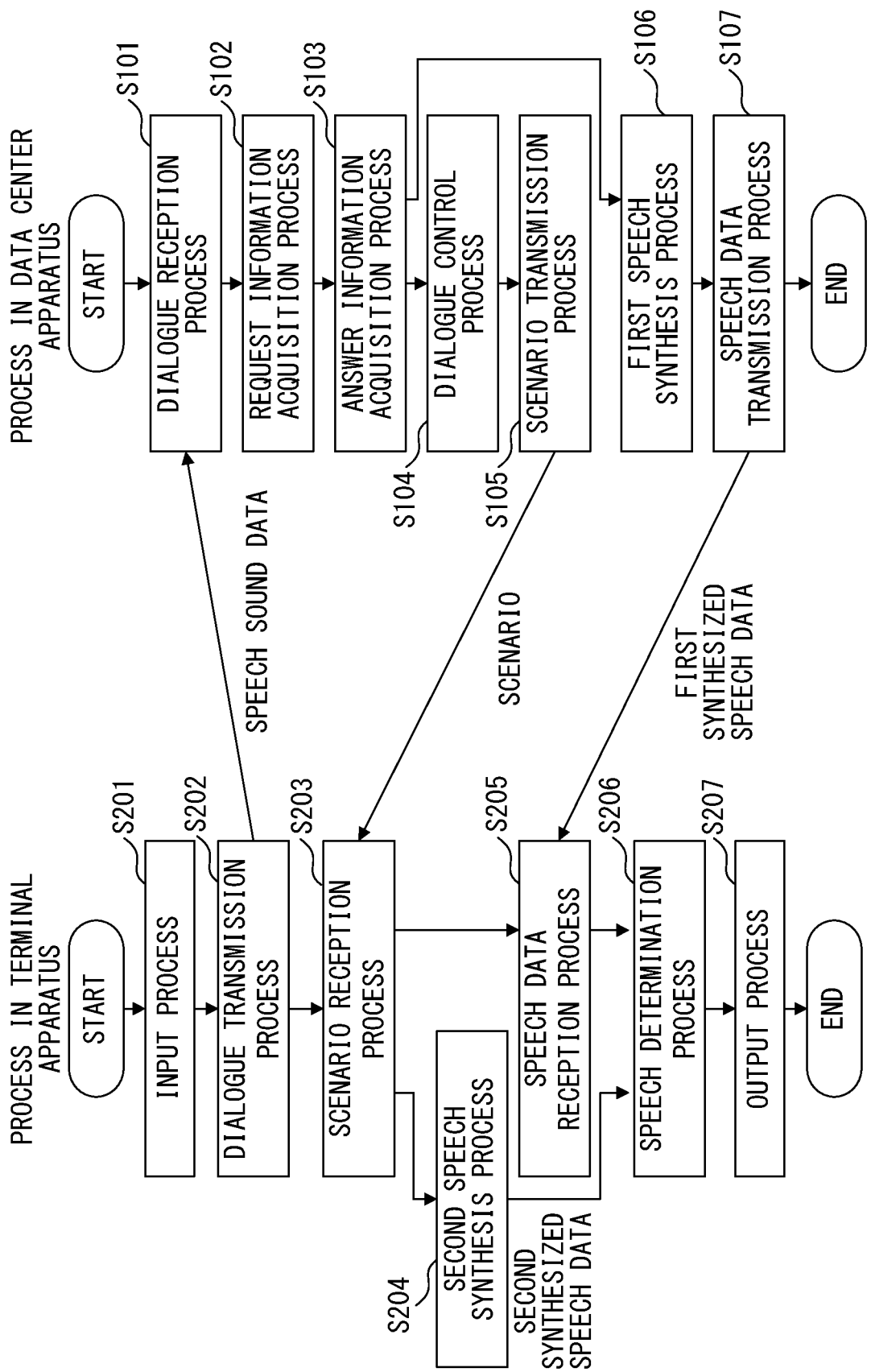
FIG. 8 is a flow chart illustrating a processing procedure of a control process executed in the speech dialogue system.

The control process executed in the speech dialogue system of FIG. 2 will be described with reference to FIG. 8. FIG. 8 is a flow chart illustrating a processing procedure of the control process.

In the processes illustrated in FIG. 8, the MPU 41 of the data center apparatus 10 executes processes of S101 to S107, and the MPU 51 of the terminal apparatus 20 executes processes of S201 to S207.

In FIG. 8, the MPU 51 of the terminal apparatus 20 executes an input process of S201. The process is a process of controlling the input unit 54 to acquire input of speech sound by the user of the terminal apparatus 20 and converting the acquired speech sound to speech data expressing the speech sound. The MPU 51 that executes the process and the input unit 54 provide a function of the input unit 21 of FIG. 2. Timing of the acquisition of the speech sound may be arbitrary, and for example, press of a predetermined button switch or touch of a predetermined button icon on a touch panel may be the start timing of the acquisition. In this case, the MPU 51 may acquire input of a text character string from the user associated with the operation on the keyboard apparatus by the user of the terminal apparatus 20.

The MPU 51 of the terminal apparatus 20 executes a dialogue transmission process of S202. The process is a process of controlling the communication unit 56 to transmit the speech data obtained in the input process of S201 to the communication network 30 addressed to the data center apparatus 10. The MPU 51 that executes the process and the communication unit 56 provide a function of the dialogue transmission unit 22 of FIG. 2.

Meanwhile, the MPU 41 of the data center apparatus 10 executes a dialogue reception process of S101. The process is a process of controlling the communication apparatus 47 to receive the speech data of the speech sound that is transmitted from the terminal apparatus 20 that is subjected to the dialogue transmission process of S202, through the communication network 30. The MPU 41 that executes the process and the communication apparatus 47 provide a function of the dialogue reception unit 11 of FIG. 2.

The MPU 41 of the data center apparatus 10 executes a request information acquisition process of S102. The process is a process of applying a speech recognition process to the speech data received in the dialogue reception process of S101 to acquire request information expressed by the speech data. The MPU 41 that executes the process provides a function of the request information acquisition unit 12 of FIG. 2.

The MPU 41 of the data center apparatus 10 executes an answer information acquisition process of S103. The process is a process of acquiring answer information for the request information acquired in the request information acquisition process of S102 from, for example, the database 14 stored in the disk array apparatus 44. The MPU 41 that executes the process provides a function of the answer information acquisition unit 13 of FIG. 2.

The MPU 41 of the data center apparatus 10 executes a dialogue control process of S104. The process is a process of creating, as described above, a scenario including the answer information acquired in the answer information acquisition process of S103. The MPU 41 that executes the process provides a function of the dialogue control unit 15 of FIG. 2.

The MPU 41 of the data center apparatus 10 executes a scenario transmission process of S105. The process is a process of controlling the communication apparatus 47 to transmit the scenario created in the dialogue control process of S104 to the communication network 30 addressed to the terminal apparatus 20. The MPU 41 that executes the process and the communication apparatus 47 provide a function of the scenario transmission unit 18 of FIG. 2.

The MPU 41 of the data center apparatus 10 executes a first speech synthesis process of S106. The process is a process of creating first synthesized speech data expressing the synthesized speech that generates the sound of the answer information acquired in the answer information acquisition process of S103. The MPU 41 executes the first speech synthesis process in parallel with the scenario transmission process of S105. The first speech synthesis process may be executed in parallel with the dialogue control process of S104, just after the acquisition of the answer information in the answer information acquisition process of S103. The MPU 41 that executes the first speech synthesis process provides a function of the first speech synthesis unit 16 of FIG. 2.

The MPU 41 of the data center apparatus 10 executes a speech data transmission process of S107. The process is a process of controlling the communication apparatus 47 to transmit the first synthesized speech data created in the first speech synthesis process of S106 to the communication network 30 addressed to the terminal apparatus 20. The MPU 41 that executes the process and the communication apparatus 47 provide a function of the speech data transmission unit 17 of FIG. 2. Then, the MPU 41 of the data center apparatus 10 ends the control process.

Meanwhile, the MPU 51 of the terminal apparatus 20 executes a scenario reception process of S203 following the dialogue transmission process of S202. In the scenario reception process, the MPU 51 first executes a process of controlling the communication unit 56 to receive the scenario that is transmitted from the data center apparatus 10 that is subjected to the scenario transmission process of S105, through the communication network 30. The MPU 51 then executes a process of analyzing the received scenario to extract, from the scenario, information of speech data necessary for reproduction or information of text to be displayed. The MPU 51 that executes the process and the communication unit 56 provide a function of the scenario reception unit 23 of FIG. 2.

Next, the MPU 51 of the terminal apparatus 20 executes a second speech synthesis process of S204. The process is a process of creating second synthesized speech data expressing the synthesized speech that generates the sound of the answer information included in the scenario received in the scenario reception process of S203.

The capability of the arithmetic processing of the MPU 51 of the terminal apparatus 20 is significantly lower than that of the MPU 41 of the data center apparatus 10. The storage capacities of the non-volatile memory 52 and the RAM 53 of the terminal apparatus 20 are significantly smaller than those of the RAM 43 and the disk array apparatus 44 of the data center apparatus 10. Therefore, compared to the first speech synthesis process of S106 executed in the data center apparatus 10, the second speech synthesis process of S204 is a simpler process, allowing the implementation in the terminal apparatus 20. In general, the quality of the speech synthesis process improves with an increase in the scale of a speech waveform dictionary used. However, the amount of processing increases. In the present embodiment, a process of using a database of a large-scale sentence corpus (dictionary including ten thousand to several tens of thousands of sentences and frequently used examples of speech in various intonations) with a data size of several gigabytes to several tens of gigabytes is executed in the first speech synthesis process. Meanwhile, a process of using a syllable database (for example, a dictionary including only 50 sounds, voiced sounds, and semi-voiced sounds in a case of Japanese and a dictionary including only vowels and consonants in a case of English) with a data size of about several megabytes to several tens of megabytes is executed in the second speech synthesis process.

The MPU 51 that executes the second speech synthesis process of S204 provides a function of the second speech synthesis unit 24 of FIG. 2.

The MPU 51 of the terminal apparatus 20 executes a speech data reception process of S205 in parallel with the execution of the second speech synthesis process of S204. The process is a process of controlling the communication unit 56 to receive the first synthesized speech data that is transmitted from the data center apparatus 10 that is subjected to the speech data transmission process of S107, through the communication network 30. The MPU 51 that executes the process and the communication unit 56 provide a function of the speech data reception unit 25 of FIG. 2.

The MPU 51 of the terminal apparatus 20 executes a speech determination process of S206. The process is a process of determining whether the reception of the first synthesized speech data in the speech data reception process of S205 is completed and selecting one of the first synthesized speech data and the second synthesized speech data created in the second speech synthesis process of S204 based on the determination result. The MPU 51 that executes the process provides a function of the speech determination unit 26 of FIG. 2.

Next, the MPU 51 of the terminal apparatus 20 executes an output process of S207. The process is a process of controlling the output unit 55 to output synthesized speech expressed by the synthesized speech data selected in the speech determination process of S206. When the MPU 51 finds out that it is described to display text as a result of analysis of the scenario in the scenario reception process of S203, the MPU 51 also executes, in the output process, a process of displaying the text according to the analysis result. The MPU 51 that executes the process and the output unit 55 provide a function of the output unit 27 of FIG. 2. The MPU 51 of the terminal apparatus 20 then ends the control process.

The foregoing control process is executed in the speech dialogue system of FIG. 2. In the control process, when the data center apparatus 10 acquires the answer information in the process of S103, the scenario is created and transmitted in the processes of S104 and S105 without waiting for the creation of the first synthesized speech data in the process of S106. Therefore, even if the arrival of the first synthesized speech data is delayed, the terminal apparatus 20 can create the second synthesized speech data from the answer information included in the scenario in the process of S204 and reproduce the second synthesized speech data in the process of S207 to provide the latest answer information. As a result, the occurrence of the no-response state in dialogue is suppressed. When the first synthesized speech data arrives, the terminal apparatus 20 can reproduce the arrived first synthesized speech data to provide answer information by high-quality speech, even without processing capability for executing a high-quality speech synthesis process.

Figure 9:
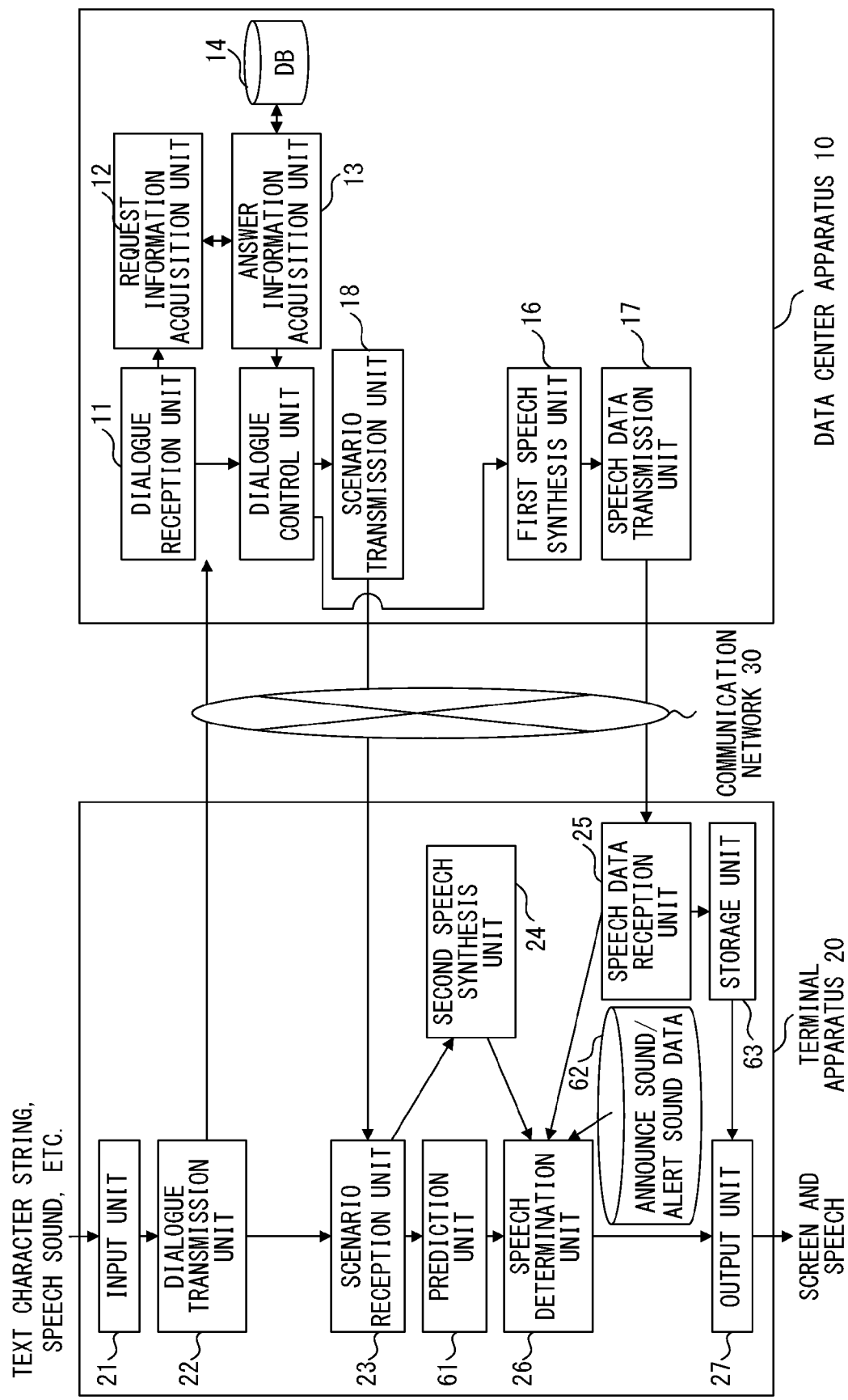
FIG. 9 is a functional configuration diagram of another embodiment of the speech dialogue system.

Next, FIG. 9 will be described. FIG. 9 is a functional configuration diagram of another embodiment of the speech dialogue system.

In addition to the configuration of FIG. 2, the terminal apparatus 20 further includes a prediction unit 61, announce sound/alert sound data 62, and a storage unit 63 in the configuration of the speech dialogue system of FIG. 9. Functions related to the constituent elements will be described.

The prediction unit 61 predicts a first time at which the output unit 27 can start outputting the synthesized speech expressed by the first synthesized speech data after the completion of the reception of the first synthesized speech data by the speech data reception unit 25. In this case, the speech determination unit 26 selects the second synthesized speech data created by the second speech synthesis unit 24 at a time before the predicted first time and selects the first synthesized speech data received by the speech data reception unit 25 at a time after the first time.

In this way, the output unit 27 outputs the synthesized speech expressed by the second synthesized speech data at a time before the first time, and the output unit 27 outputs the synthesized speech expressed by the first synthesized speech data at a time after the first time. Therefore, the synthesized speech to be output can be smoothly switched from the synthesized speech expressed by the second synthesized speech data to the synthesized speech expressed by the high-quality first synthesized speech data.

The prediction unit 61 predicts the first time based on, for example, response time until reception of a reply transmitted from the data center apparatus 10 for a predetermined request transmitted to the data center apparatus 10 and based on the data size of the first synthesized speech data. Based on the response time and the data size of the first synthesized speech data, the prediction unit 61 calculates total time of the response time and time required to download the first synthesized speech data to predict completion time of the reception of the first synthesized speech data by the speech data reception unit 25.

The prediction unit 61 further predicts a second time at which the output unit 27 can start outputting the synthesized speech expressed by the second synthesized speech data after the completion of the creation of the second synthesized speech data by the second speech synthesis unit 24. In this case, the speech determination unit 26 selects the announce sound/alert sound data 62 that is prepared predetermined speech data, before the first time and before the second time.

In this way, the output unit 27 outputs an announce sound or an alert sound expressed by the announce sound/alert sound data 62 at a time before the first time and before the second time. Therefore, the announce sound or the alert sound is output at a time before the completion of the reception of the first synthesized speech data and before the completion of the creation of the second synthesized speech data, and the time of the no-response state in dialogue is further reduced.

In the speech dialogue system of FIG. 9, the speech determination unit 26 switches the selection of the synthesized speech data from the second synthesized speech data to the first synthesized speech data at the first time as described above. In this case, the output unit 27 may switch the output to the synthesized speech expressed by the first synthesized speech data in the middle of the output of the synthesized speech expressed by the second synthesized speech data. In this way, switch to high-quality synthesized speech expressed by the first synthesized speech data is possible without waiting for the end of the reproduction of the synthesized speech expressed by the second synthesized speech data.

The storage unit 63 in the speech dialogue system of FIG. 9 stores the first synthesized speech data received by the speech data reception unit 25. In this case, the speech determination unit 26 determines whether the first synthesized speech data received by the speech data reception unit 25 is already stored in the storage unit 63 based on the answer information included in the scenario received by the scenario reception unit 23. If the speech determination unit 26 determines that the first synthesized speech data is already stored in the storage unit 63, the first synthesized speech data is selected. If it is determined that the first synthesized speech data is already stored in the storage unit 63, the output unit 27 outputs the synthesized speech expressed by the first synthesized speech data already stored in the storage unit 63.

When the transfer of data for dialogue is repeated between the data center apparatus 10 and the terminal apparatus 20 in the speech dialogue system of FIG. 9, the answer information included in the scenario may be the same as answer information included in a scenario transmitted in the past. In this case, the output unit 27 uses the first synthesized speech data that is already stored in the storage unit 63 and that generates the sound of the answer information to output the synthesized speech. Therefore, the storage unit 63 provides a function of a cache memory that stores the first synthesized speech data. In this way, the terminal apparatus 20 can reproduce high-quality synthesized speech expressed by the first synthesized speech data already stored in the storage unit 63, at a time earlier than the arrival of new first synthesized speech data.

The hardware configuration of the speech dialogue system of FIG. 9 is similar to the configuration of FIG. 2. More specifically, the data center apparatus 10 has the configuration illustrated in FIG. 6, and the terminal apparatus 20 has the configuration illustrated in FIG. 7. According to this configuration, the announce sound/alert sound data 62 is stored in advance in the non-volatile memory 52 of FIG. 7. According to this configuration, the RAM 53 of FIG. 7 is also used as the storage unit 63 in the speech dialogue system of FIG. 9.

When the hardware configuration of the speech dialogue system of FIG. 9 is the configuration described above, the process illustrated in the flow chart of FIG. 8 is changed as described below in the control process executed by the MPU 41 of the data center apparatus 10 and the MPU 51 of the terminal apparatus 20.

Figure 10:
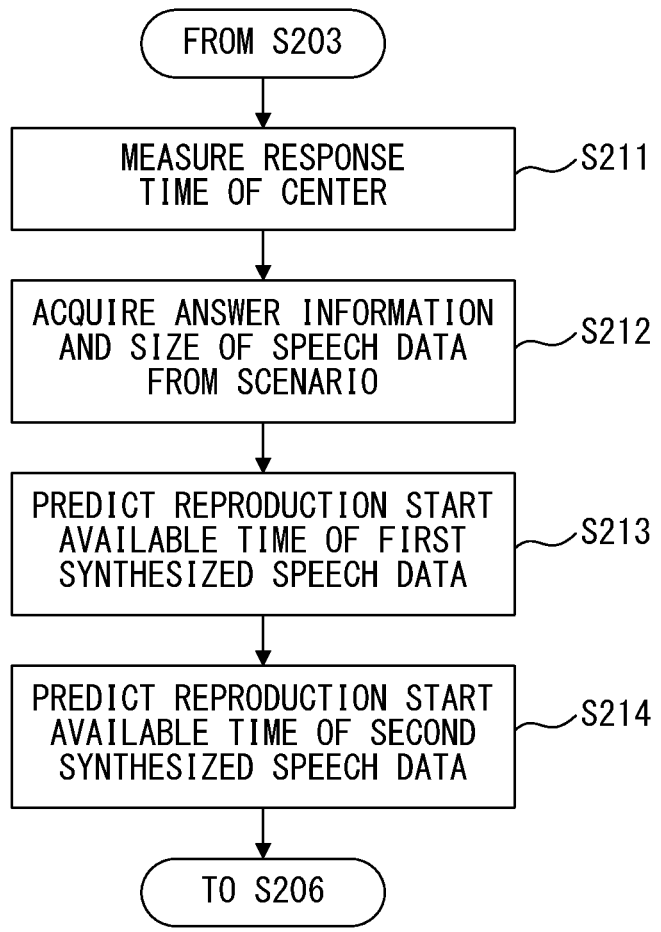
FIG. 10 is a flow chart illustrating a processing procedure of a prediction process.

FIG. 10 will be described first. FIG. 10 is a flow chart illustrating a processing procedure of a prediction process. The prediction process is executed in parallel with the execution of the second speech synthesis process of S204 and the speech data reception process of S205 after the scenario reception process of S203 in the control process illustrated in FIG. 8.

In the following description, TCP (Transmission Control Protocol) is commonly used as a communication protocol in the communication network 30, and the data center apparatus 10 and the terminal apparatus 20 use packets of the TCP to transfer data.

In S211 of FIG. 10, the MPU 51 of the terminal apparatus 20 executes a process of measuring response time of the data center apparatus 10. In the process, the MPU 51 first executes a process of starting operation of a timer function not illustrated included in the MPU 51 to start clocking the elapsed time. The MPU 51 then executes a process of controlling the communication unit 56 to transmit predetermined reply request information for measuring the response time to the communication network 30 addressed to the data center apparatus 10.

In the data center apparatus 10, for example, the MPU 41 executes a predetermined control program, and the MPU 41 executes a predetermined control process when the communication apparatus 47 receives the reply request information. The control process is a process of controlling the communication apparatus 47 and transmitting predetermined reply information to the communication network 30 addressed to the terminal apparatus 20 when the MPU 41 detects the reception of the reply request information by the communication apparatus 47.

The MPU 51 then executes a detection process of reception of the reply request information by the communication unit 56 transmitted from the data center apparatus 10. If the reception is detected, the MPU 51 executes a process of terminating the operation of the timer function and acquiring a clocking result of the elapsed time up to this time. The clocking result serves as response time. This time is often called RTT (Round Trip Time) in the field of the communication.

The MPU 51 may measure the RTT every certain period, independently from the implementation of the control process of FIG. 8. The MPU 51 may measure the RTT by, for example, using communication of handshake at the transmission of various data, such as speech data, between the communication unit 56 of the terminal apparatus 20 and the communication apparatus 47 of the data center apparatus 10.

In S212, the MPU 51 of the terminal apparatus 20 executes a process of acquiring the text data of the answer information and the data size of the first synthesized speech data from the scenario received in the scenario reception process of S203 of FIG. 8. For the process, a process of adding, to the text, information of the amount of data of the first synthesized speech data with the data file name described in the text or information of a predicted value of the amount of data is executed in the dialogue control process of S104 executed by the data center apparatus 10. In this regard, the data center apparatus 10 may execute the dialogue control process of S104 when the data size of the first synthesized speech data is found out after the completion of the first speech synthesis process of S106. A process of estimating the amount of data of the first synthesized speech data from the amount of data of the answer information obtained in the answer information acquisition process of S103 may also be executed in the dialogue control process of S104.

In S213, the MPU 51 of the terminal apparatus 20 executes a process of predicting a first time at which the output of the synthesized speech expressed by the first synthesized speech data can be started after the completion of the reception of the first synthesized speech data. The first time is predicted as follows.

When the window size of the TCP in the terminal apparatus 20 is defined as w, the transfer speed of data by the TCP in this case is w/RTT. Therefore, when the data size of the first synthesized speech data is defined as S, time T required for the transfer of the first synthesized speech data is calculated by the following formula.

$$T = S \times RTT/w$$

Therefore, the MPU 51 sets, as a prediction result of the first time, the time obtained by adding the value T calculated by the computation of the formula to the time of the start of the reception of the first synthesized speech data in the speech data reception process of S205 of FIG. 8.

If, for example, a transfer bit rate b of the first synthesized speech data is known, the MPU 51 may calculate S/b to obtain the time T required to transfer the first synthesized speech data.

In S214, the MPU 51 of the terminal apparatus 20 executes a process of predicting a second time at which the output of the synthesized speech expressed by the second synthesized speech data can be started after the completion of the creation of the second synthesized speech data. Subsequently, the prediction process of FIG. 10 is finished. The second time is predicted as follows.

Figure 11:
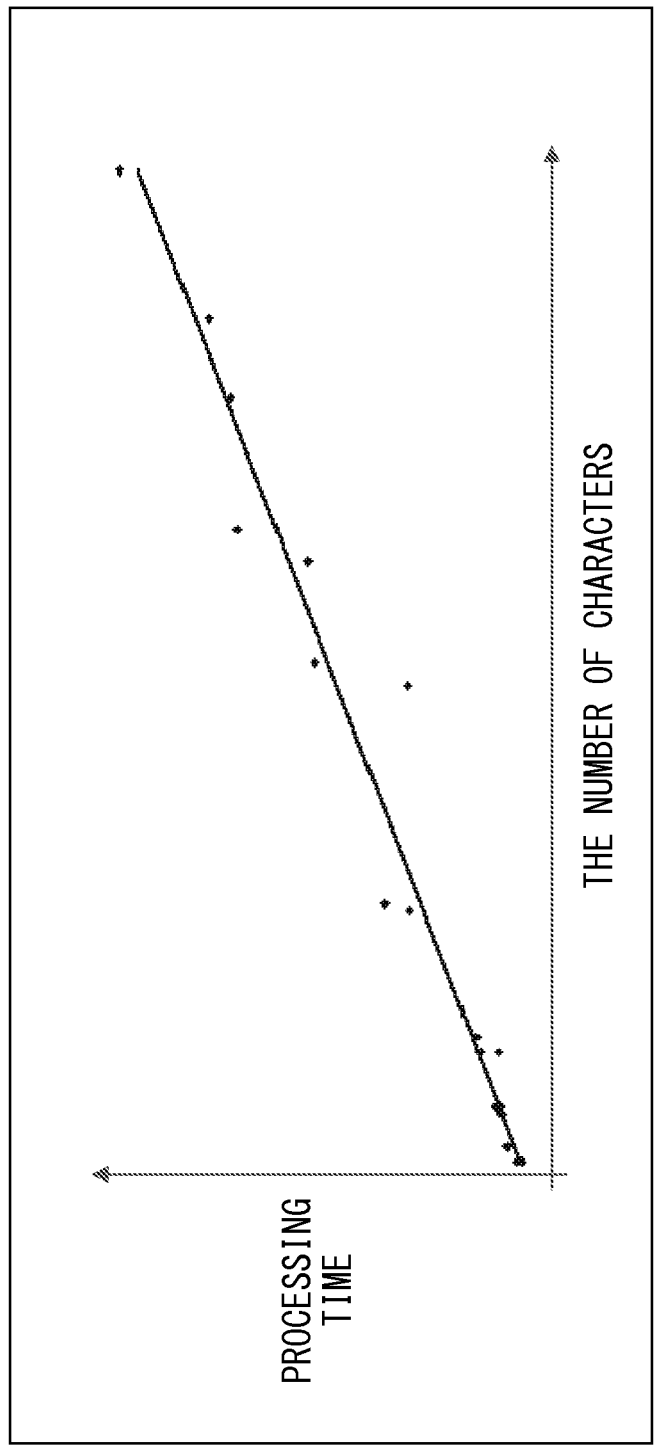
FIG. 11 is a graph illustrating an example of a relationship between the number of characters of text to be processed and processing time in a speech synthesis process.

FIG. 11 will be described first. FIG. 11 is a graph illustrating an example of a relationship between the number of characters of text to be processed in the speech synthesis process and processing time. As can be recognized from the graph, the processing time of the speech synthesis process generally increases in proportion to the number of characters of the text to be processed. Therefore, the number of characters of the text to be processed and the processing time of the execution of the speech synthesis process for the text are measured in advance, and a proportional constant is obtained from the measurement result. In this way, the processing time required for the speech synthesis process for the text to be processed can be predicted by performing calculation of multiplying the number of characters of the text by the proportional constant.

More specifically, the number of characters of the text to be processed is changed, and the relationship between the number of characters and the processing time of the second synthesis process of FIG. 8 is measured to obtain the proportional constant in this relationship. In the process of S214, a process of counting the number of characters of the text data of the answer information acquired from the scenario in the process of S212 and calculating a value obtained by multiplying the number of characters by the proportional constant is executed. The time obtained by adding the value calculated by the above multiplication to the time of the start of the creation of the second synthesized speech data in the second speech synthesis process of S204 of FIG. 8 is set as a prediction result of the second time.

The foregoing process is the prediction process of FIG. 10. The MPU 51 that executes the process and the communication unit 56 provide a function of the prediction unit 61 of FIG. 9.

After the end of the prediction process of FIG. 10, the MPU 51 advances the process to the speech determination process of S206 in the control process illustrated in FIG. 8. Details of the speech determination process executed at this point will be described with reference to FIG. 12.

When the communication unit 56 receives the first synthesized speech data in the speech data reception process of S205 executed in parallel with the prediction process, the MPU 51 further executes a process of storing the first synthesized speech data in the RAM 53 as the storage unit 63. In this case, the MPU 51 executes a process of storing the answer information that generates the sound based on the first synthesized speech data, in the RAM 53 in association with the first synthesized speech data.

Figure 12:
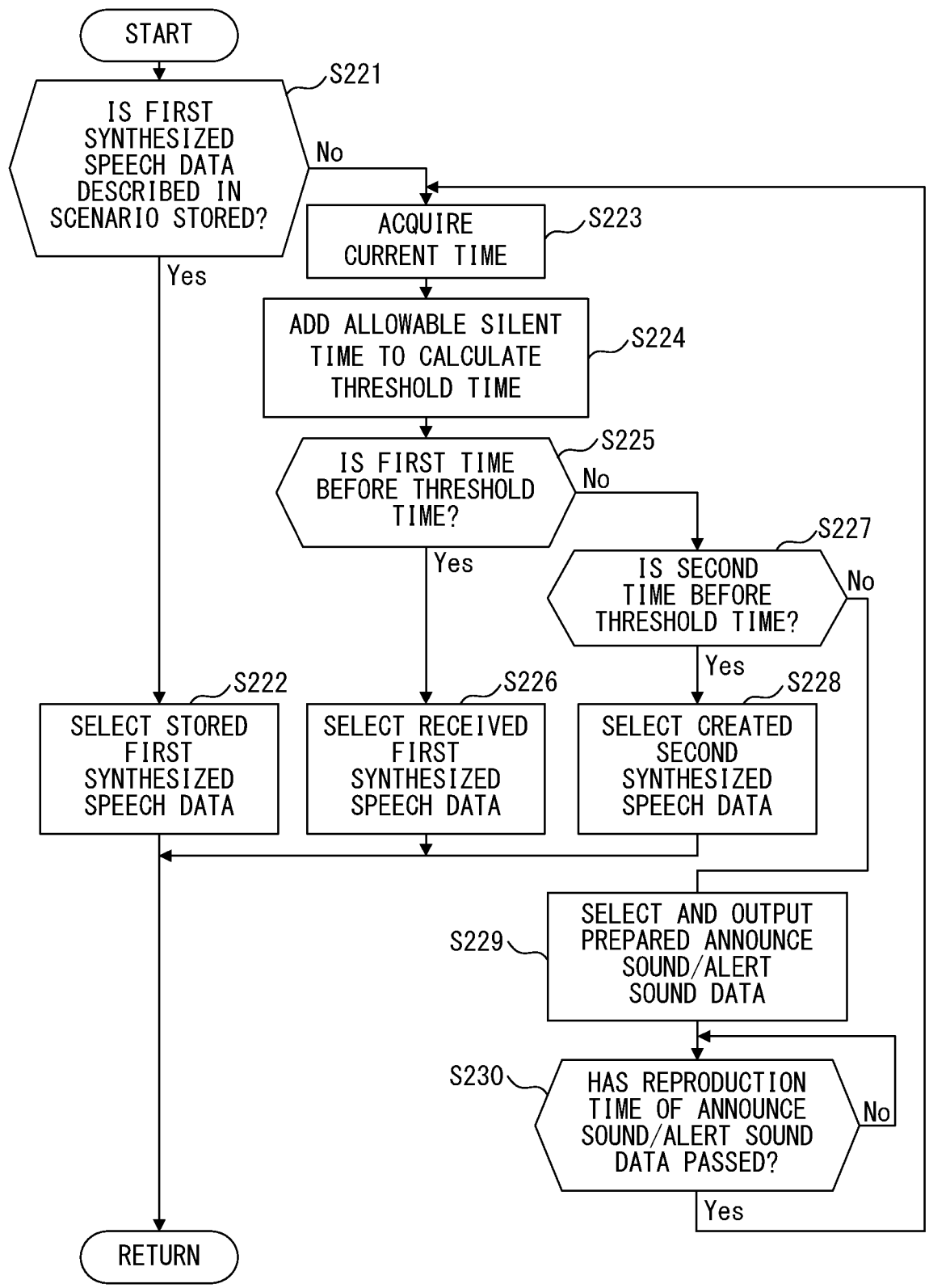
FIG. 12 is a flow chart illustrating a processing procedure of a speech determination process executed following the prediction process.

FIG. 12 is a flow chart illustrating a processing procedure of the speech determination process executed following the prediction process of FIG. 10.

In S221 of FIG. 12, the MPU 51 executes a process of determining whether the first synthesized speech data described in the scenario is already stored in the RAM 53 as the storage unit 63. The determination is performed by determining whether information corresponding to the answer information that is described in the scenario and that generates the sound of the first synthesized speech data is stored in the RAM 53. If the MPU 51 determines that the first synthesized speech data described in the scenario is already stored (when the determination result is Yes), the MPU 51 advances the process to S222. On the other hand, if the MPU 51 determines that the first synthesized speech data described in the scenario is not stored (when the determination result is No), the MPU 51 advances the process to S223.

In S222, the MPU 51 executes a process of selecting the first synthesized speech data determined to be stored in the process of S221, and then the speech determination process is finished to advance the process to the output process of S207 of FIG. 8. In the output process, the MPU 51 executes a process of controlling the output unit 55 to read the selected first synthesized speech data from the RAM 53 to output the synthesized speech expressed by the read first synthesized speech data.

Meanwhile, in S223, the MPU 51 executes a process of acquiring current time, i.e. time at the point of the process. The MPU 51 acquires the current time from a clock not illustrated included in the MPU 51 or from a clock not illustrated connected to the MPU 51.

In S224, the MPU 51 executes a process of adding allowable silent time, i.e. time of allowable no-response state in the dialogue between the user and the terminal apparatus 20, to the current time acquired in the process of S223 to calculate threshold time. Although time of about one to two seconds is usually set as the silent time according to the result of assessment, zero seconds can also be set.

In S225, the MPU 51 executes a process of determining whether the first time predicted in the process of S213 in the prediction process of FIG. 10 is before the threshold time calculated in the process of S224. If the MPU 51 determines that the first time is before the threshold time (when the determination result is Yes), the MPU 51 advances the process to S226. If the MPU 51 determines that the first time is after the threshold time (when the determination result is No), the MPU 51 advances the process to S227.

In S226, the MPU 51 executes a process of selecting the first synthesized speech data, the reception of which is completed in the speech data reception process of S205. The speech determination process is then finished, and the process proceeds to the output process of S207 of FIG. 8. In the output process, the MPU 51 executes a process of controlling the output unit 55 to output the synthesized speech expressed by the first synthesized speech data, the reception of which is completed in the speech data reception process of S205.

Meanwhile, in S227, the MPU 51 executes a process of determining whether the second time predicted in the process of S214 in the prediction process of FIG. 10 is before the threshold time calculated in the process of S224. If the MPU 51 determines that the second time is before the threshold time (when the determination result is Yes), the MPU 51 advances the process to S228. If the MPU 51 determines that the second time is after the threshold time (when the determination result is No), the MPU 51 advances the process to S229.

In S228, the MPU 51 executes a process of selecting the second synthesized speech data, the creation of which is completed in the second speech synthesis process of S204. The speech determination process is then finished, and the process proceeds to the output process of S207 of FIG. 8. In the output process, the MPU 51 executes a process of controlling the output unit 55 to output the synthesized speech expressed by the second synthesized speech data, the creation of which is completed in the second speech synthesis process of S204.

In S229, the MPU 51 executes a process of selecting the announce sound/alert sound data 62 stored in advance in the non-volatile memory 52 and controlling the output unit 55 to output the speech expressed by the announce sound/alert sound data 62 read from the non-volatile memory 52.

In S230, the MPU 51 executes a process of determining whether the time required for the reproduction of the announce sound/alert sound data 62 reproduced in the process of S229 has passed. If the MPU 51 determines that the time required for the reproduction of the announce sound/alert sound data 62 has passed (when the determination result is Yes), the MPU 51 returns the process to S223 to repeat the process described above. On the other hand, if the MPU 51 determines that the time required for the reproduction of the announce sound/alert sound data 62 has not passed (when the determination result is No), the MPU 51 repeats the determination process of S230 until the passage of the time required for the reproduction.

After the end of the prediction process of FIG. 10, the MPU 51 executes the process of FIG. 12 in the speech determination process of S206 of FIG. 8. As a result, speech is output in various output patterns as illustrated in FIG. 13.

Figure 13:
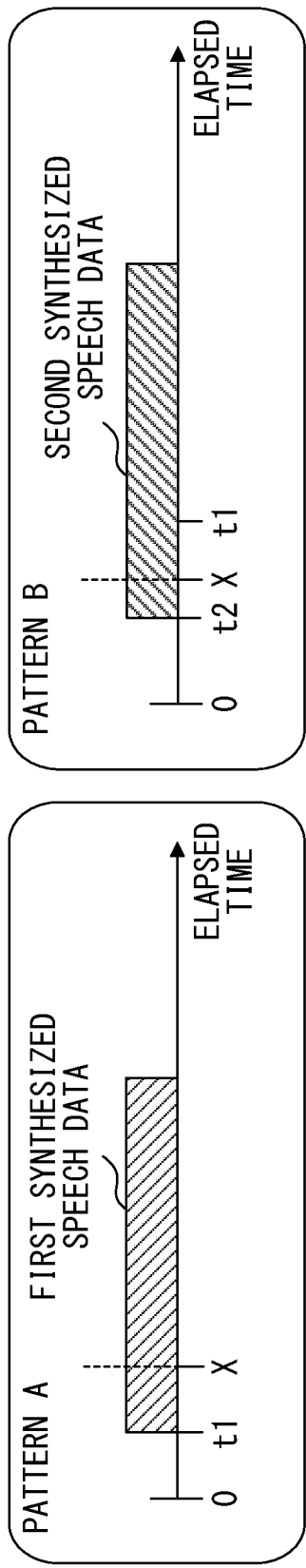
FIG. 13 is a diagram illustrating examples of speech output patterns from the terminal apparatus in the speech dialogue system of FIG. 9.

In the patterns illustrated in FIG. 13, t1 and t2 denote the first time and the second time, respectively, and X denotes the threshold time. Furthermore, la denotes the time required for the reproduction of the announce sound/alert sound data 62.

A pattern A is a speech output pattern when the result of the determination process of S221 of FIG. 12 is No, and the result of the determination process of S225 executed just after that is Yes. In this case, since the first time t1 is before the threshold time X, the output unit 55 outputs the synthesized speech expressed by the first synthesized speech data, the reception of which is completed in the speech data reception process of S205.

A pattern B is a speech output pattern when the result of the determination process of S221 of FIG. 12 is No, the result of the determination process of S225 executed just after that is also No, and the result of the determination process of S227 executed just after that is Yes. In this case, since the second time t2 is before the threshold time X, the output unit 55 outputs the synthesized speech expressed by the second synthesized speech data, the creation of which is completed in the second speech synthesis process of S204.

A pattern C is a speech output pattern when the result of the determination process of S227 is No, and the result of the determination process of S225 executed just after that is Yes. In this case, the output unit 55 outputs the speech expressed by the announce sound/alert sound data 62. The threshold time is changed from X to X+la in the process of S224 executed subsequently. As a result, the first time t1 is before the threshold time X+la. Therefore, following the speech expressed by the announce sound/alert sound data 62, the output unit 55 outputs the synthesized speech expressed by the first synthesized speech data, the reception of which is completed in the speech data reception process of S205.

A pattern D is a speech output pattern when the result of the determination process of S227 is No, the result of the determination process of S225 executed just after that is also No, and the result of the determination process of S227 executed just after that is Yes. In this case, the output unit 55 outputs the speech expressed by the announce sound/alert sound data 62. The threshold time is changed from X to X+la in the process of S224 executed subsequently. As a result, the second time t2 is before the threshold time X+la. Therefore, following the speech expressed by the announce sound/alert sound data 62, the output unit 55 outputs the synthesized speech expressed by the second synthesized speech data, the creation of which is completed in the second speech synthesis process of S204.

A plurality of announce sound/alert sound data 62 may be prepared. In general, the user is bored if the user hears the speech of the same phrase again and again. Therefore, for example, a short alert sound "blip" and a long announce sound "inquiring the center" are prepared as the announce sound/alert sound data 62. In this case, if, for example, the process of S229 of FIG. 12 is repeated, the announce sound and the alert sound to be output may be switched in each repetition, and for example, the time of the sound may be gradually reduced.

A pattern E in FIG. 13 indicates a modification example of the pattern D and denotes a case when the reception of the first synthesized speech data is completed in the speech data reception process of S205 in the middle of the output of the synthesized speech expressed by the second synthesized speech data. In this case, the synthesized speech to be output by the output unit 55 may be switched from the synthesized speech expressed by the second synthesized speech data to the synthesized speech data expressed by the first synthesized speech data at the completion of the reception of the first synthesized speech data.

The method of switching the speech output will be further described with reference to FIG. 14.

Figure 14:
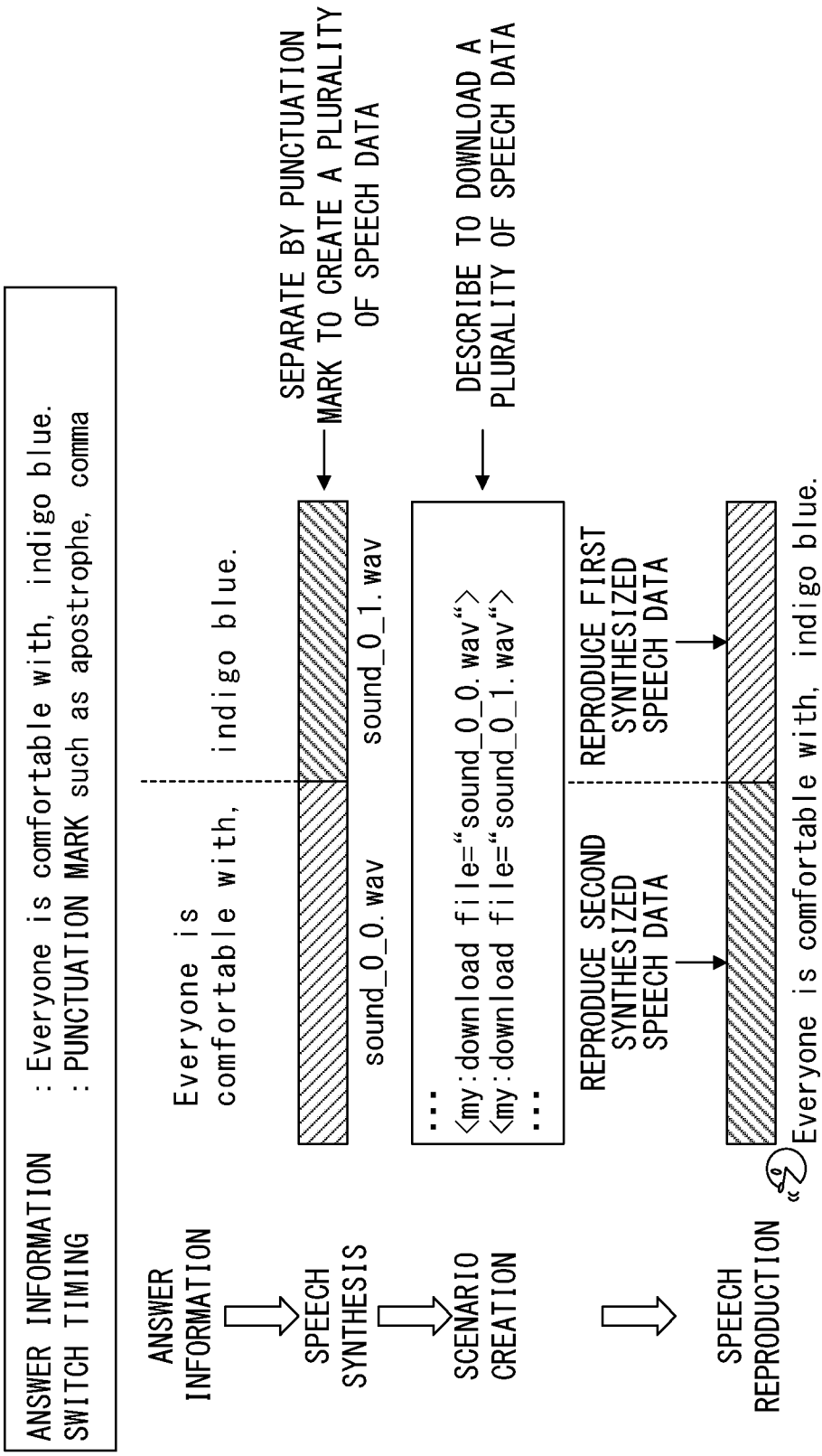
FIG. 14 is an explanatory view of a method of switching speech output.

FIG. 14 illustrates an example in which the answer information acquired in the answer information acquisition process of S103 of FIG. 8 is text data "Everyone is comfortable with, indigo blue."

In the first speech synthesis process of S106 of FIG. 8, the MPU 41 of the data center apparatus 10 executes a process of separating and dividing the text data of the answer information by a punctuation mark such as apostrophe and comma to create first synthesized speech data for each divided text data. In the example of FIG. 14, the answer information is divided into text data "Everyone is comfortable with," and "indigo blue.", and first synthesized speech data "sound_0_0.wav" and "sound_0_1.wav" are created for the text data, respectively. In the speech data transmission process of S107, the plurality of created first synthesized speech data are transmitted to the terminal apparatus 20 according to the order in the text data of the original answer information.

In the creation of the scenario in the dialogue control process of S104 of FIG. 8, the MPU 41 executes a process of describing the filenames of the two first synthesized speech data in the scenario in association with the answer information "Everyone is comfortable with, indigo blue."

Meanwhile, in the second speech synthesis process of S204 of FIG. 8, the MPU 51 of the terminal apparatus 20 executes a process of separating and dividing the text data of the answer information included in the received scenario by a punctuation mark to create the second synthesized speech data for each divided text data. In the speech data reception process of S205, the MPU 51 executes a process of receiving the plurality of first synthesized speech data transmitted from the data center apparatus 10. In the prediction process illustrated in FIG. 10, the MPU 51 predicts the first time for each of the plurality of first synthesized speech data.

Subsequently, the MPU 51 executes the process of the procedure illustrated in FIG. 12 in the speech determination process of S206 of FIG. 8. In the speech output pattern of the pattern E of FIG. 13, the flow from the output of the speech expressed by the announce sound/alert sound data 62 to the output of the synthesized speech expressed by the second synthesized speech data in the process is the same as in the pattern D. However, in the pattern E, if the current time passes the first time t1 after the output of the synthesized speech expressed by the second synthesized speech data, the synthesized speech to be output is switched to the synthesized speech expressed by the first synthesized speech data. The output of the synthesized speech is switched at the punctuation mark as a separation that divides the text data of the answer information as illustrated in FIG. 14.

Figure 15:
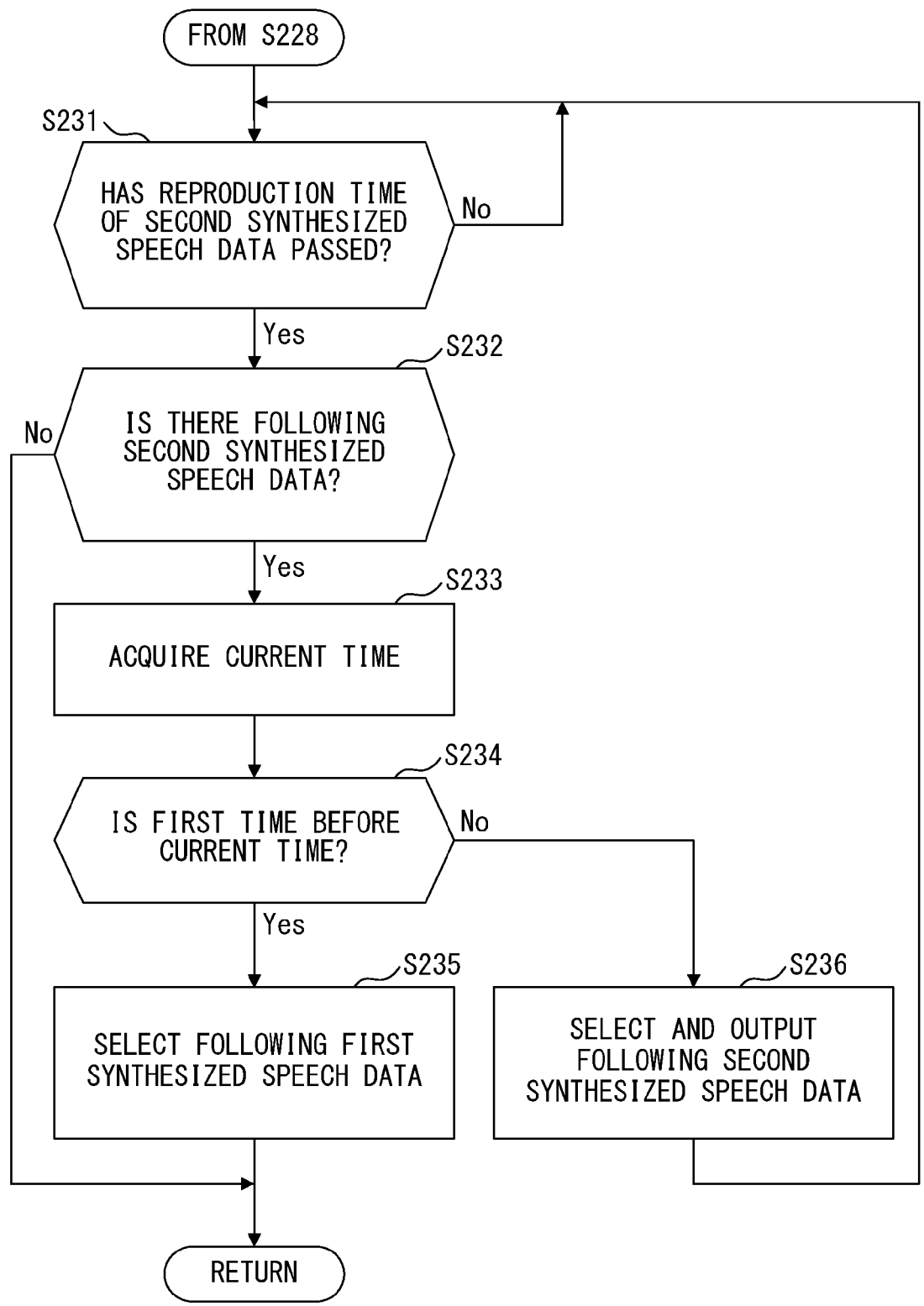
FIG. 15 is a flow chart illustrating a modification example of the processing procedure of the speech determination process of FIG. 12.

FIG. 15 will be described. FIG. 15 is a flow chart illustrating a modification example of the processing procedure of the speech determination process of FIG. 12. The modification example is for realizing the speech output pattern of the pattern E in FIG. 13.

The process illustrated in FIG. 15 is executed following the process of S228 in FIG. 12.

In S231 following S228 of FIG. 12, the MPU 51 executes a process of determining whether the time required for the reproduction of the second synthesized speech data, the reproduction of which is most recently started, has passed. If the MPU 51 determines that the time required for the reproduction of the second synthesized speech data has passed (when the determination result is Yes), the MPU 51 advances the process to S232. On the other hand, if the MPU 51 determines that the time required for the reproduction of the second synthesized speech data has not passed (when the determination result is No), the MPU 51 repeats the determination process of S231 until the passage of the time required for the reproduction.

In S232, the MPU 51 executes a process of determining whether there is next second synthesized speech data following the second synthesized speech data, the reproduction of which is most recently finished. If the MPU 51 determines that there is the following second synthesized speech data (when the determination result is Yes), the MPU 51 advances the process to S223. On the other hand, if the MPU 51 determines that there is no following second synthesized speech data (when the determination result is No), the MPU 51 ends the speech determination process and advances the process to the output process of S207 of FIG. 8. In the output process, since there is no following second synthesized speech data, the MPU 51 immediately ends the speech output and ends the process of FIG. 8.

In S233, the MPU 51 executes a process of acquiring the current time as in the process of S223 of FIG. 12.

In S234, the MPU 51 executes a process of determining whether the first time predicted in the prediction process of FIG. 10 in relation to the first synthesized speech data that generates the sound of the same text as the following second synthesized speech data is before the current time acquired in the process of S233. The first synthesized speech data will be called "following first synthesized speech data". If the MPU 51 determines that the first time related to the following first synthesized speech data is before the current time (when the determination result is Yes), the MPU 51 advances the process to S235. On the other hand, if the MPU 51 determines that the first time related to the following first synthesized speech data is after the current time (when the determination result is No), the MPU 51 advances the process to S236.

In S235, the MPU 51 executes a process of selecting the following first synthesized speech data and then ends the speech determination process to advance the process to the output process of S207 of FIG. 8. In the output process, the MPU 51 executes a process of controlling the output unit 55 to output the synthesized speech expressed by the following first synthesized speech data. If there is subsequent first synthesized speech data of the following first synthesized speech data, the MPU 51 executes a process of causing the output unit 55 to continuously output the synthesized speech expressed by the subsequent first synthesized speech data.

Meanwhile, in S236, the MPU 51 executes a process of selecting the following second synthesized speech data and controlling the output unit 55 to output the speech expressed by the following second synthesized speech data. The process then returns to S231 to repeat the process described above.

As a result of the execution of the process by the MPU 51, the output can be switched to the synthesized speech expressed by the first synthesized speech data in the middle of the output of the synthesized speech expressed by the second synthesized speech data.

The punctuation mark is used as a separation for dividing the text data of the answer information in the method of switching the speech output illustrated in FIG. 14. In place of this, an end of a sentence, a certain number of characters, a breath group, or the like may be used as a separation. The data center apparatus 10 may describe information related to the timing of the separation in the scenario, and the terminal apparatus 20 may switch the speech if the download of the following first synthesized speech data is completed at the time of the timing.

The speech dialogue system according to the above embodiments attains an advantageous effect of suppressing occurrence of a no-response state in dialogue, regardless of the situation of the communication network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A speech dialogue system comprising:
a data center apparatus that
receives speech data of speech sound transmitted from a terminal apparatus,
applies a speech recognition process to the speech data to acquire request information expressed by the speech data, acquires answer information for the request information from an information source, creates a scenario including the answer information, creates first synthesized speech data expressing synthesized speech that generates sound of the answer information, transmits the first synthesized speech data created in the creating the first synthesized speech data to the terminal apparatus, and transmits the scenario to the terminal apparatus while the first synthesized speech data is being created in the creating the first synthesized speech data; and the terminal apparatus that acquires input of the speech sound to convert the speech sound to speech data expressing the speech sound, transmits the speech data of the speech sound to the data center apparatus, receives the scenario transmitted from the data center apparatus, creates second synthesized speech data expressing the synthesized speech that generates sound of the answer information included in the received scenario, receives the first synthesized speech data transmitted from the data center apparatus, determines whether the reception of the first synthesized speech data is completed to select one of the first synthesized speech data and the second synthesized speech data based on the determination result, and outputs the synthesized speech expressed by the synthesized speech data selected in the determining, wherein the data center apparatus and the terminal apparatus being connected through a communication network.

2. The speech dialogue system according to claim 1, wherein the terminal apparatus further predicts a first time at which the output in the outputting the synthesized speech expressed by the first synthesized speech data is able to be started after the completion of the reception of the first synthesized speech data, and the terminal apparatus selects the second synthesized speech data at a time before the first time, and selects the first synthesized speech data at a time after the first time.

3. The speech dialogue system according to claim 2, wherein the terminal apparatus predicts the first time based on a response time from transmission of a predetermined request to the data center apparatus to reception of a reply for the predetermined request transmitted from the data center apparatus and based on a data size of the first synthesized speech data.

4. The speech dialogue system according to claim 2, wherein the terminal apparatus further predicts a second time at which the output in the outputting the synthesized speech expressed by the second synthesized speech data is able to be started after the completion of the creation of the second synthesized speech data, and the terminal apparatus selects prepared predetermined speech data before the first time and before the second time.

5. The speech dialogue system according to claim 2, wherein when the selection of the synthesized speech data is switched from the second synthesized speech data to the first synthesized speech data at the first time, the terminal apparatus switches the output to the synthesized speech expressed by the first synthesized speech data in the middle of the output of the synthesized speech expressed by the second synthesized speech data.

6. The speech dialogue system according to claim 1, wherein the terminal apparatus further comprises a storage apparatus that stores the first synthesized speech data, the terminal apparatus determines whether the first synthesized speech data received from the data center apparatus is already stored in the storage apparatus based on the answer information included in the received scenario, and selects the first synthesized speech data when the terminal apparatus determines that the first synthesized speech data is already stored, and when the terminal apparatus determines that the first synthesized speech data received from the data center apparatus is already stored in the storage apparatus, the terminal apparatus outputs the synthesized speech expressed by the first synthesized speech data already stored in the storage apparatus.

7. A terminal apparatus in a speech dialogue system including a data center apparatus and the terminal apparatus connected through a communication network, the terminal apparatus comprising:

an input unit that acquires input of speech sound to convert the speech sound to speech data expressing the speech sound;

a transmission unit that transmits the speech data of the speech sound to the data center apparatus;

a reception unit that receives various data;

an output unit that outputs speech expressed by the speech data; and a processor that controls the reception unit to receive a scenario including answer information acquired by the data center apparatus from an information source according to request information expressed by the speech data, wherein the scenario is created by the data center apparatus and transmitted from the data center apparatus, controls the reception unit to receive first synthesized speech data expressing synthesized speech that generates sound of the answer information, wherein the first synthesized speech data is created by the data center apparatus and transmitted from the data center apparatus, creates second synthesized speech data expressing the synthesized speech that generates sound of the answer information included in the received scenario, determines whether the reception of the first synthesized speech data is completed to select one of the first synthesized speech data and the second synthesized speech data based on the determination result, and controls the output unit to output the synthesized speech expressed by the selected synthesized speech data.

8. The terminal apparatus according to claim 7, wherein the processor further predicts a first time at which the output in the outputting the synthesized speech expressed by the first synthesized speech data is able to be started after the completion of the reception of the first synthesized speech data, and the processor selects the second synthesized speech data at a time before the first time, and selects the first synthesized speech data at a time after the first time.

9. The terminal apparatus according to claim 8, wherein the processor predicts the first time based on a response time from transmission of a predetermined request to the data center apparatus to reception of a reply for the predetermined request transmitted from the data center apparatus and based on a data size of the first synthesized speech data.

10. The terminal apparatus according to claim 8, wherein
the processor further predicts a second time at which the output in the outputting the synthesized speech expressed by the second synthesized speech data be able to be started after the completion of the creation of the second synthesized speech data, and
the processor selects prepared predetermined speech data before the first time and before the second time.

11. The terminal apparatus according to claim 8, wherein
when the processor switches the selection of the synthesized speech data from the second synthesized speech data to the first synthesized speech data at the first time, the processor switches the output to the synthesized speech expressed by the first synthesized speech data in the middle of the output of the synthesized speech expressed by the second synthesized speech data.

12. The terminal apparatus according to claim 7, further comprising
a storage apparatus that stores the first synthesized speech data, wherein
the processor determines whether the first synthesized speech data received from the data center apparatus is already stored in the storage apparatus based on the answer information included in the received scenario, and selects the first synthesized speech data when the processor determines that the first synthesized speech data is already stored, and
when the processor determines that the first synthesized speech data received from the data center apparatus is already stored in the storage apparatus, the processor controls the output unit to output the synthesized speech expressed by the first synthesized speech data already stored in the storage apparatus.

13. A non-transitory computer-readable recording medium storing a program for causing a computer to control a terminal apparatus in a speech dialogue system including a data center apparatus and the terminal apparatus connected through a communication network, the terminal apparatus including, the computer, an input unit that acquires input of speech sound to convert the speech sound to speech data expressing the speech sound, a transmission unit that transmits the speech data of the speech sound to the data center apparatus, a reception unit that receives various data, and an output unit that outputs speech expressed by the speech data, the program causing the computer to execute a process comprising:
controlling the reception unit to receive a scenario including answer information acquired by the data center apparatus from an information source according to request information expressed by the speech data, wherein the scenario is created by the data center apparatus and transmitted from the data center apparatus;
controlling the reception unit to receive first synthesized speech data expressing synthesized speech that generates sound of the answer information, wherein the first synthesized speech data is created by the data center apparatus and transmitted from the data center apparatus;
creating second synthesized speech data expressing the synthesized speech that generates sound of the answer information included in the received scenario;

determining whether the reception of the first synthesized speech data is completed to select one of the first synthesized speech data and the second synthesized speech data based on the determination result; and
controlling the output unit to output the synthesized speech expressed by the selected synthesized speech data.

14. The non-transitory computer-readable recording medium according to claim 13, wherein
the program causes the computer to execute a process of predicting a first time at which the output by the output unit of the synthesized speech expressed by the first synthesized speech data is able to be started after the completion of the reception of the first synthesized speech data, and
in the selection of the synthesized speech data, the second synthesized speech data is selected at a time before the first time, and the first synthesized speech data is selected at a time after the first time.

15. The non-transitory computer-readable recording medium according to claim 14, wherein
the first time is predicted based on a response time from transmission of a predetermined request to the data center apparatus to reception of a reply for the predetermined request transmitted from the data center apparatus and based on a data size of the first synthesized speech data.

16. The non-transitory computer-readable recording medium according to claim 14, wherein
the program causes the computer to execute a process of predicting a second time at which the output by the output unit of the synthesized speech expressed by the second synthesized speech data be able to be started after the completion of the creation of the second synthesized speech data, and
in the selection of the synthesized speech data, prepared predetermined speech data is selected before the first time and before the second time.

17. The non-transitory computer-readable recording medium according to claim 14, wherein
in the selection of the synthesized speech data, when the selection of the synthesized speech data is switched from the second synthesized speech data to the first synthesized speech data at the first time, the output is switched, in the control of the output unit, to the synthesized speech expressed by the first synthesized speech data in the middle of the output of the synthesized speech expressed by the second synthesized speech data.

18. The non-transitory computer-readable recording medium according to claim 13, wherein
the terminal apparatus further comprises a storage apparatus that stores data,
the program further causes the computer to execute a process of storing the received first synthesized speech data in the storage apparatus, and
the determining determines whether the received first synthesized speech data is already stored in the storage apparatus based on the answer information included in the received scenario, and when the determining determines that the received first synthesized speech data is already stored, the first synthesized speech data is selected, and the output unit outputs the synthesized speech expressed by the first synthesized speech data already stored in the storage apparatus.

* * * * *